Figure 43:
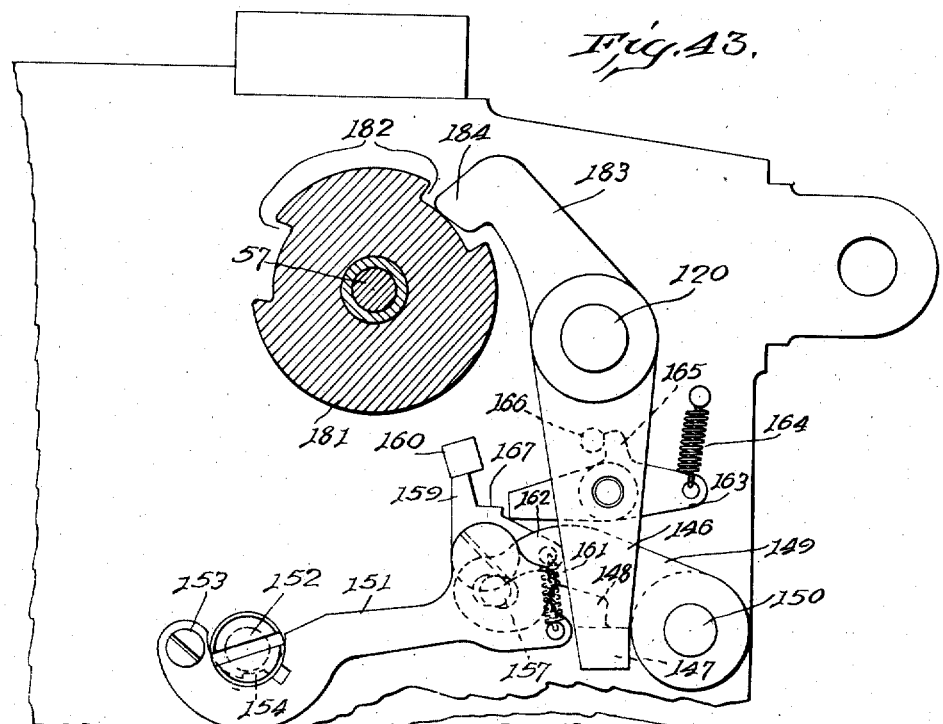

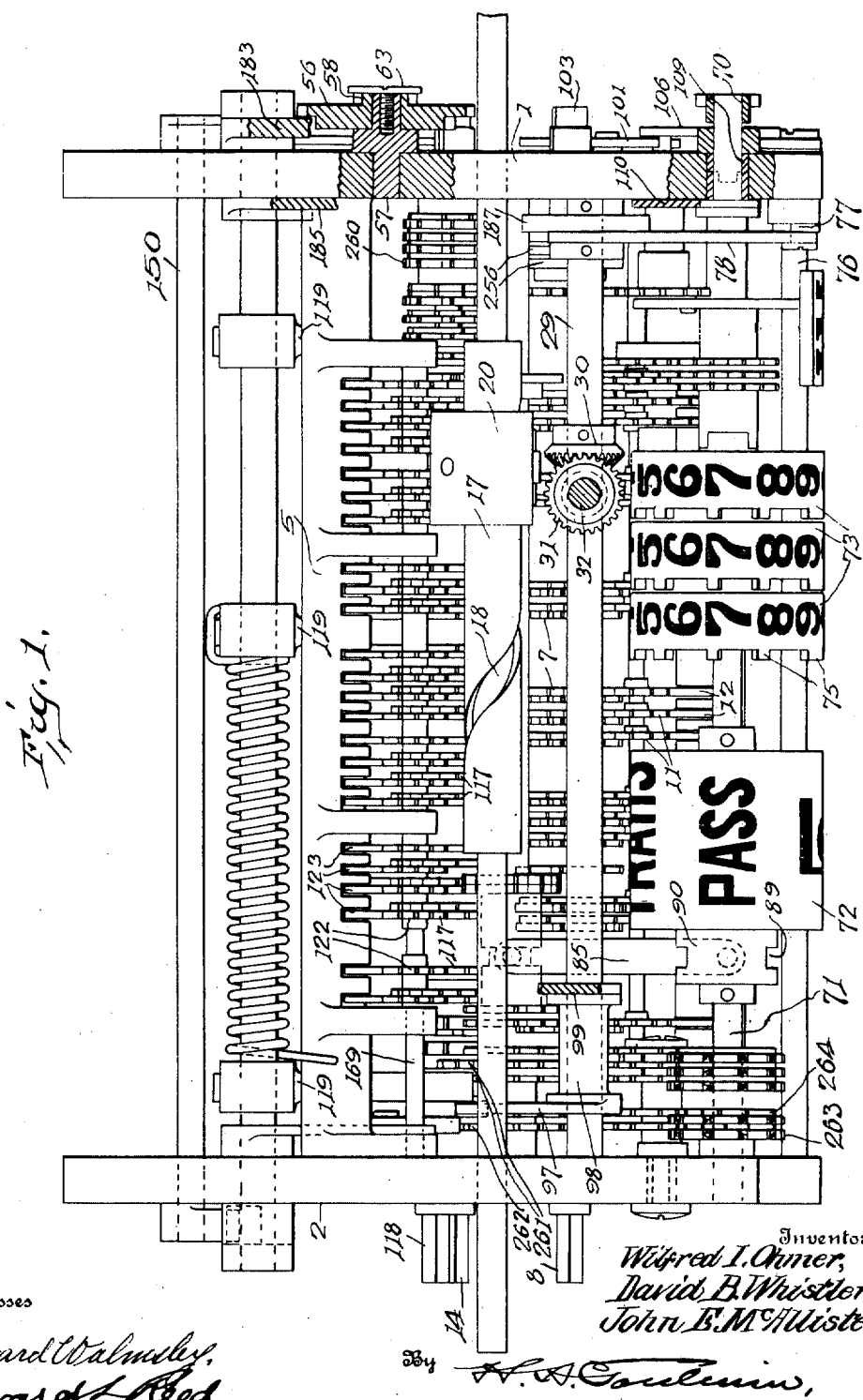

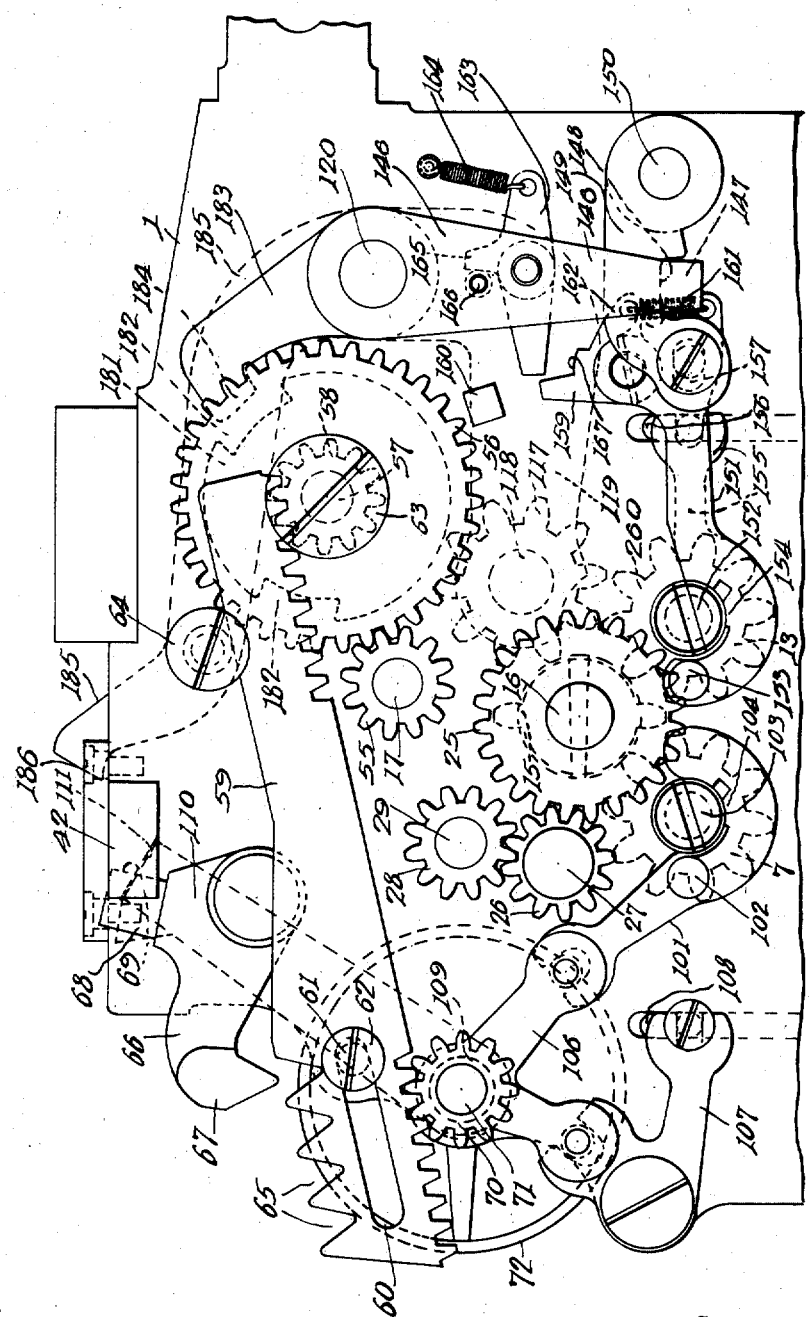

W. I. OHMER, D. B. WHISTLER & J. E. McALLISTER.
REGISTER AND RECORDER.
APPLICATION FILED MAY 3, 1909.
990,666.
Patented Apr. 25, 1911.
16 SHEETS—SHEET 3.
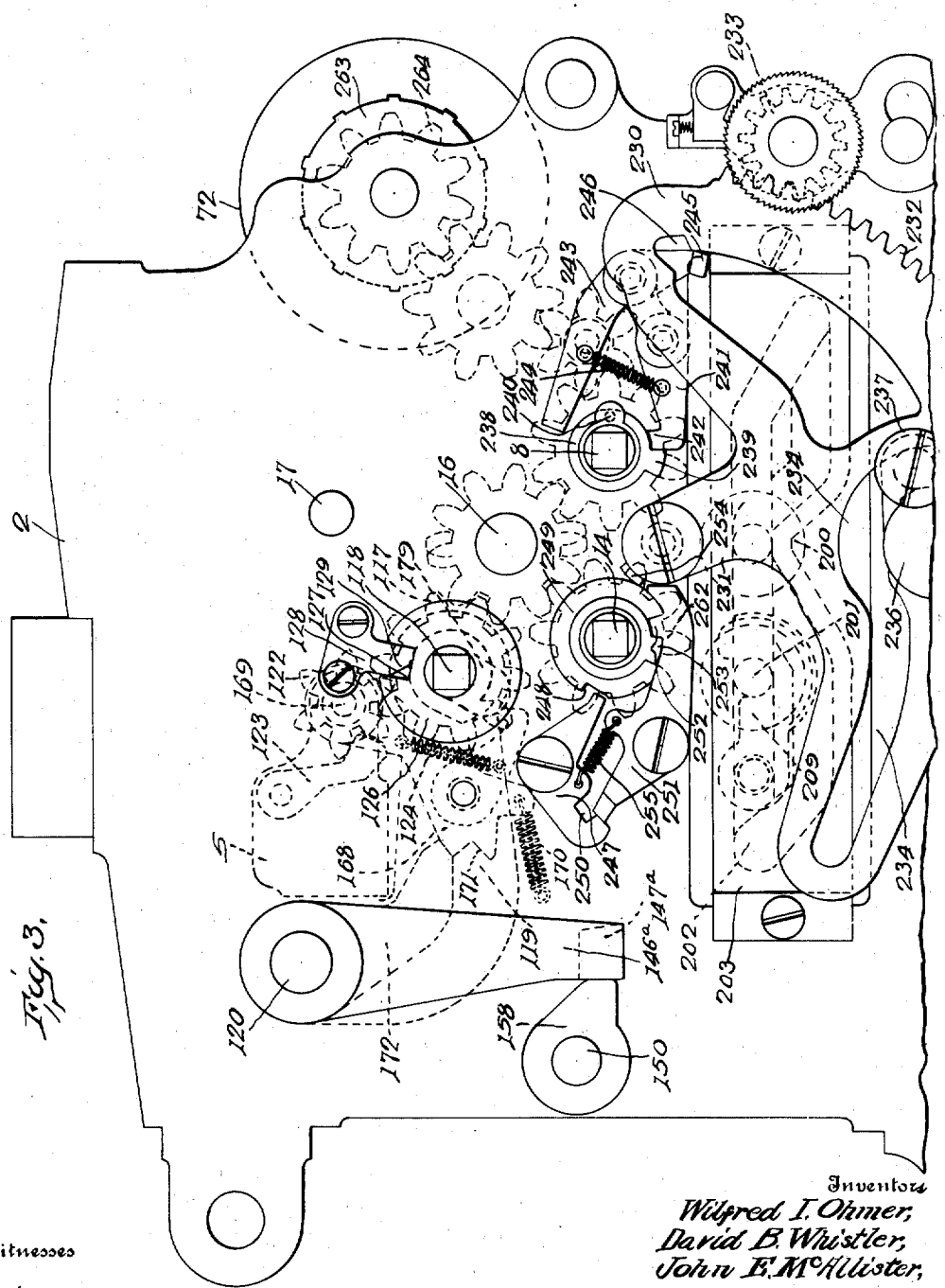

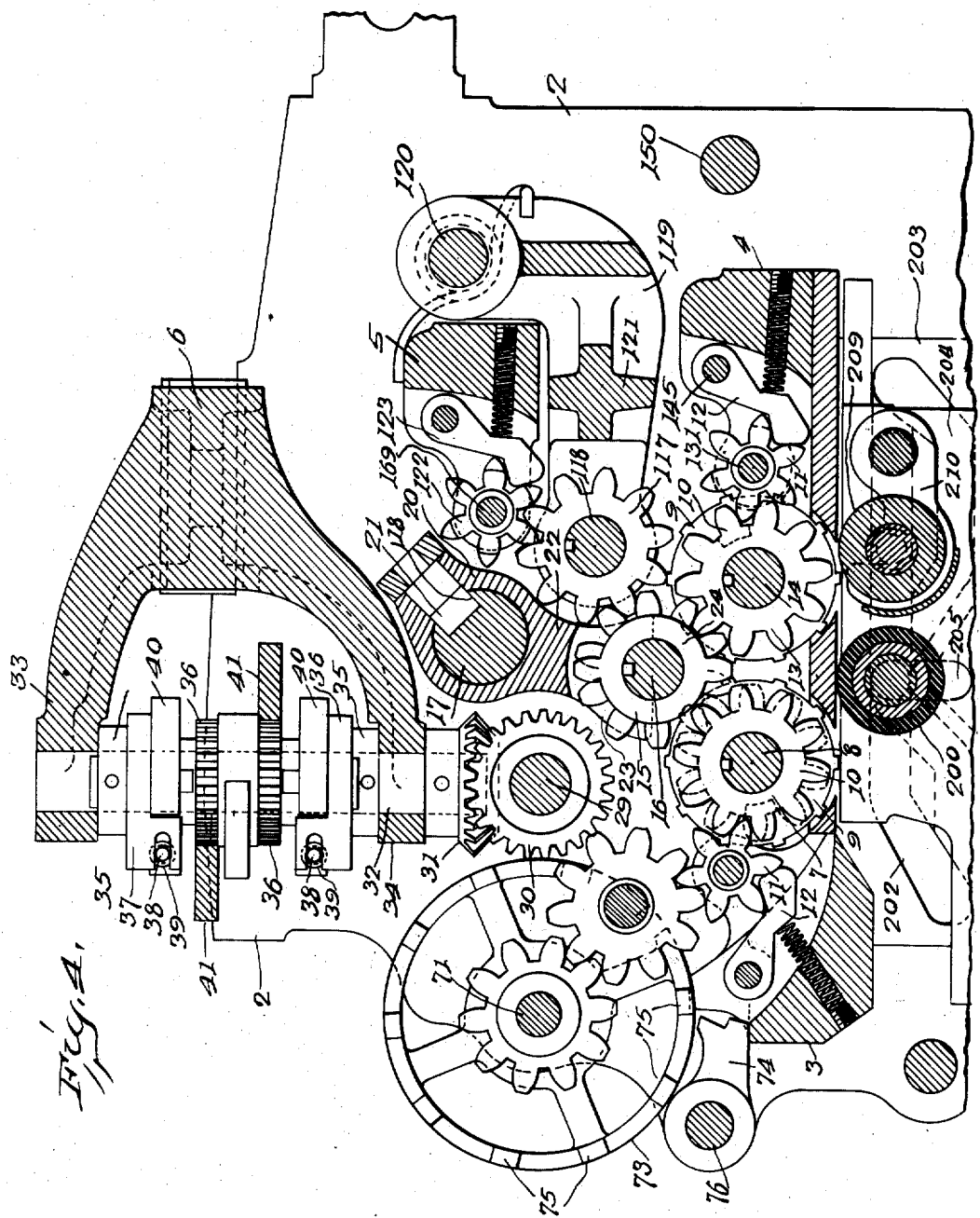

W. I. OHMER, D. B. WHISTLER & J. E. McALLISTER.
REGISTER AND RECORDER.
APPLICATION FILED MAY 3, 1909.

990,666.

Patented Apr. 25, 1911.
16 SHEETS—SHEET 5.

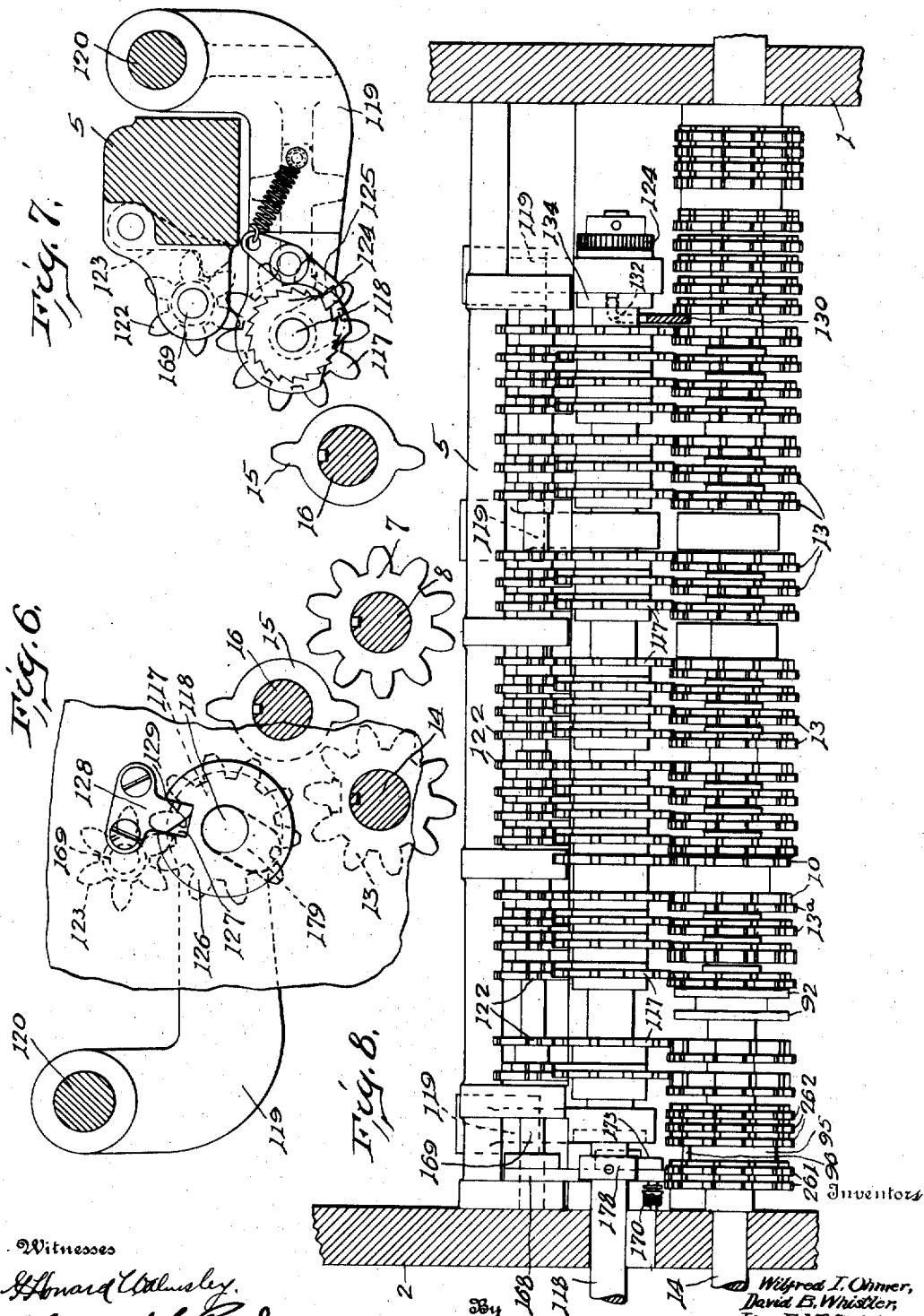

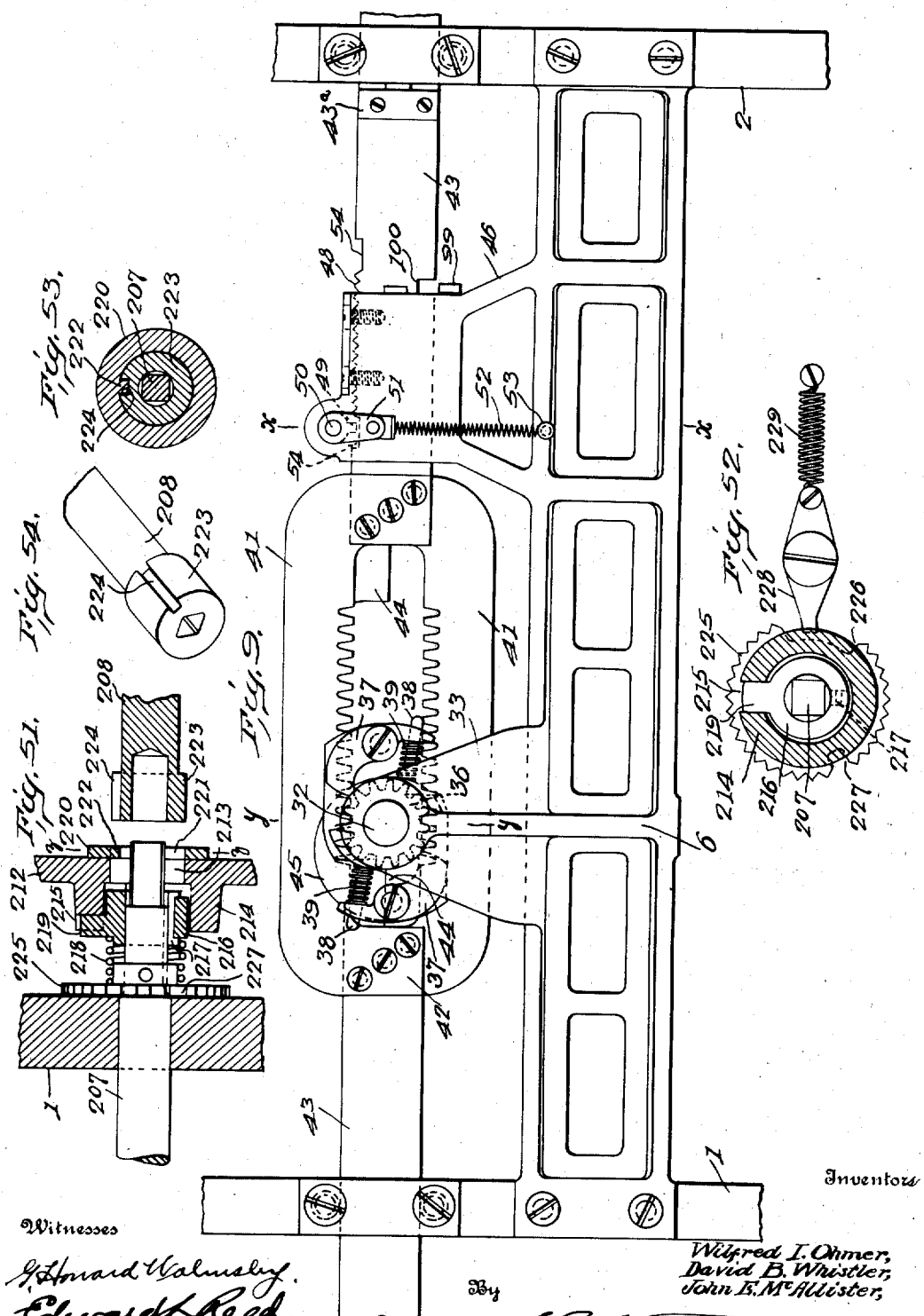

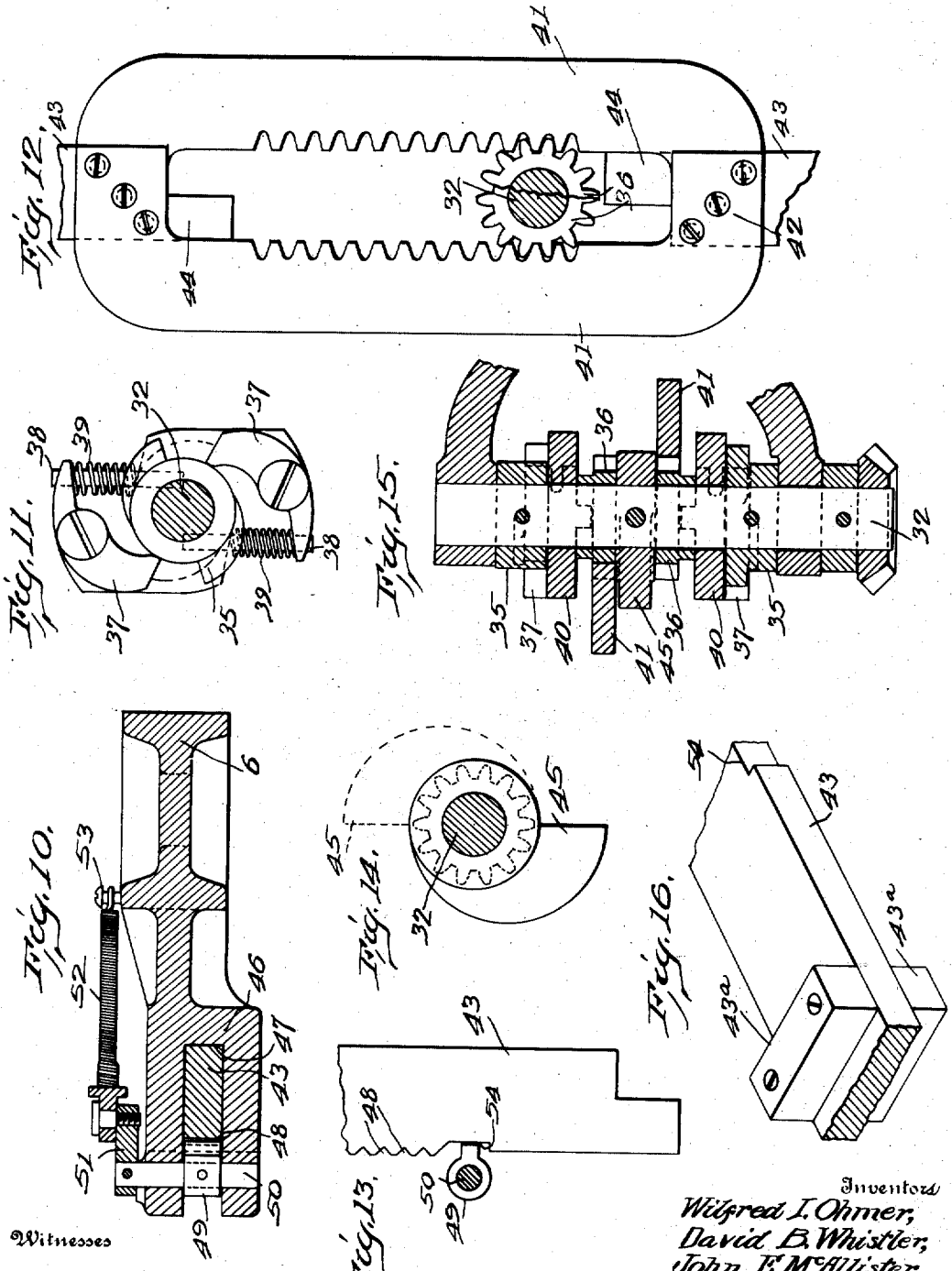

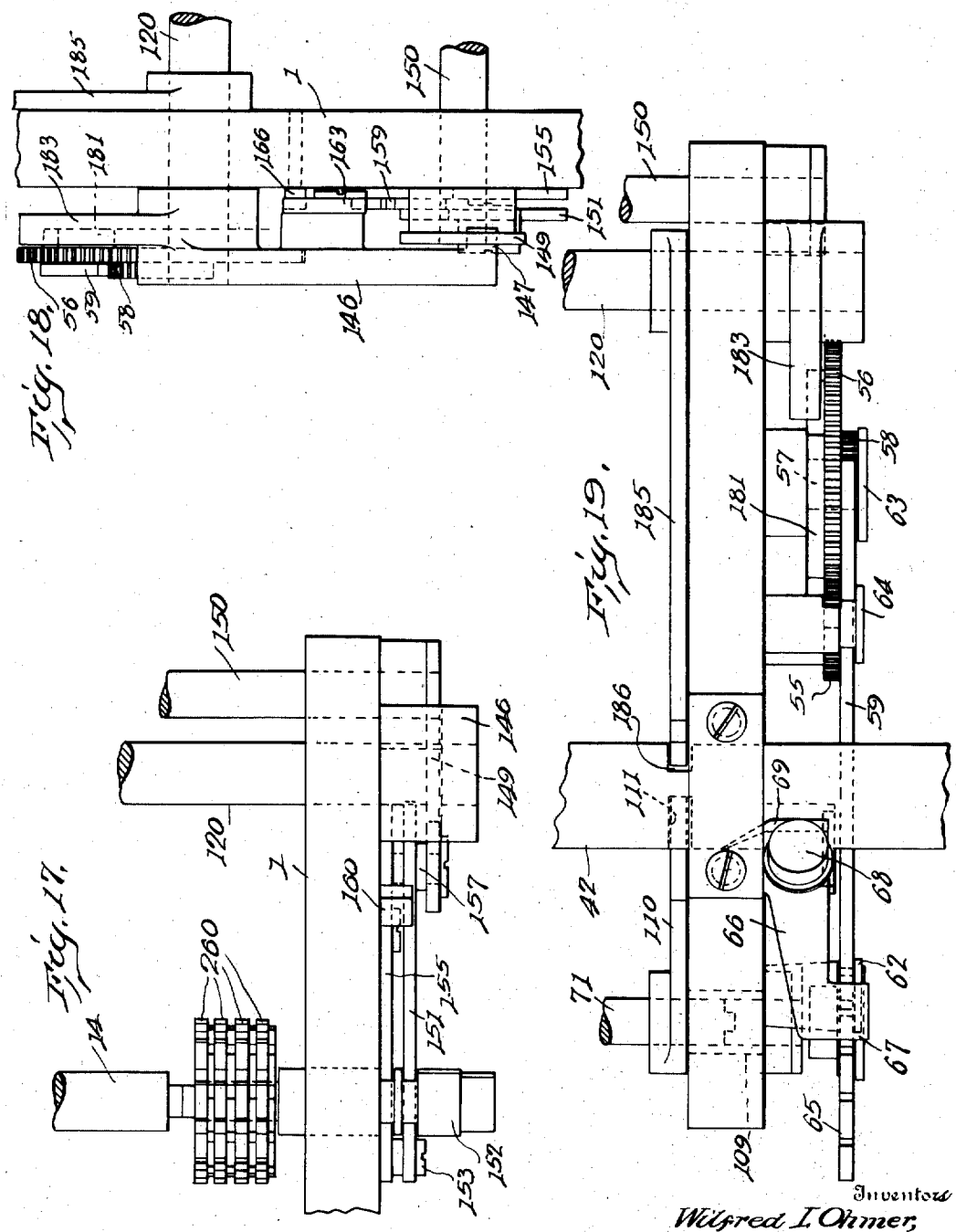

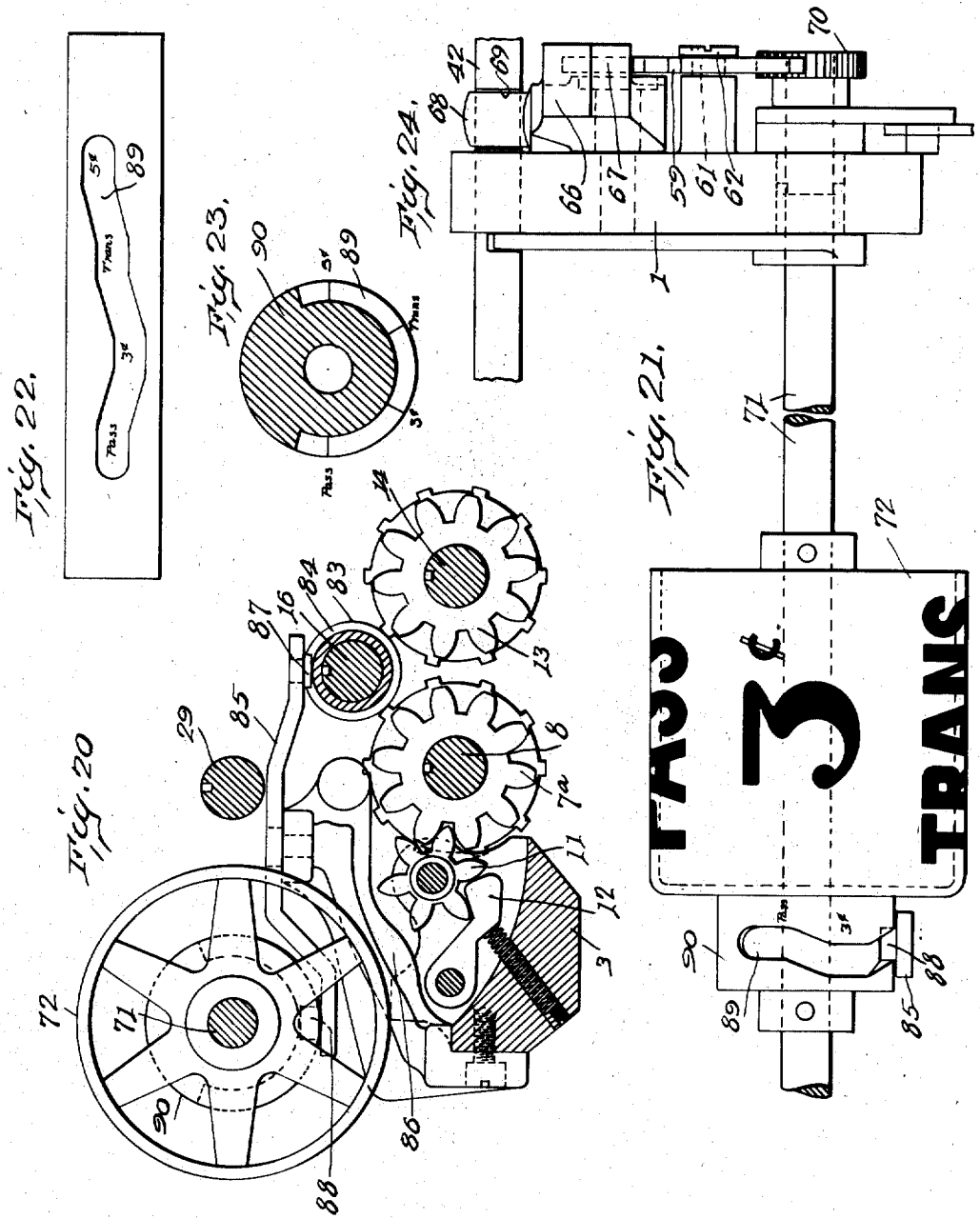

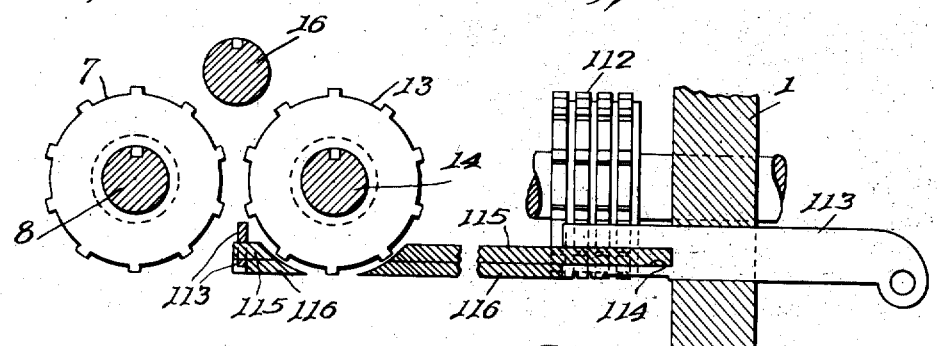

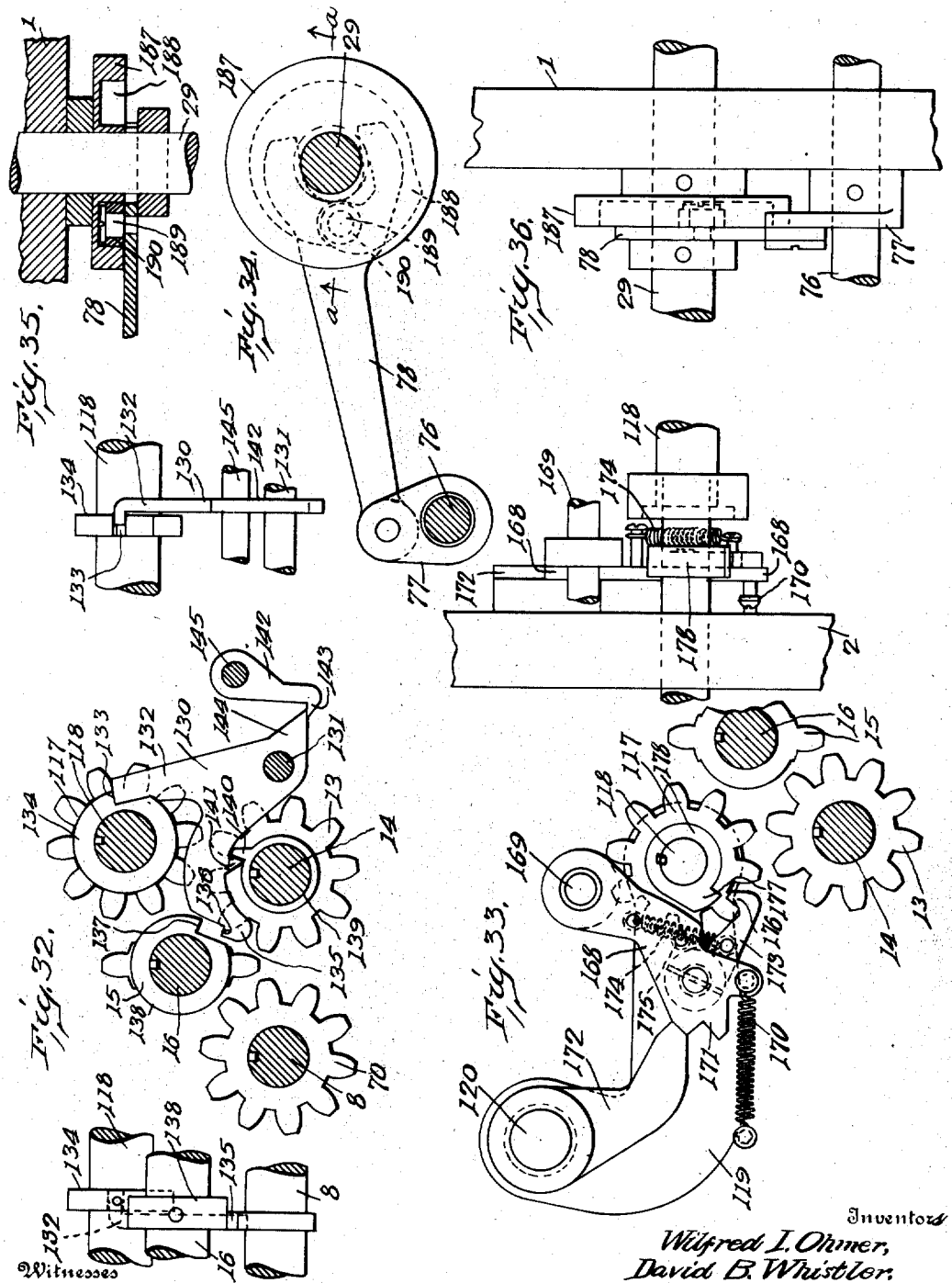

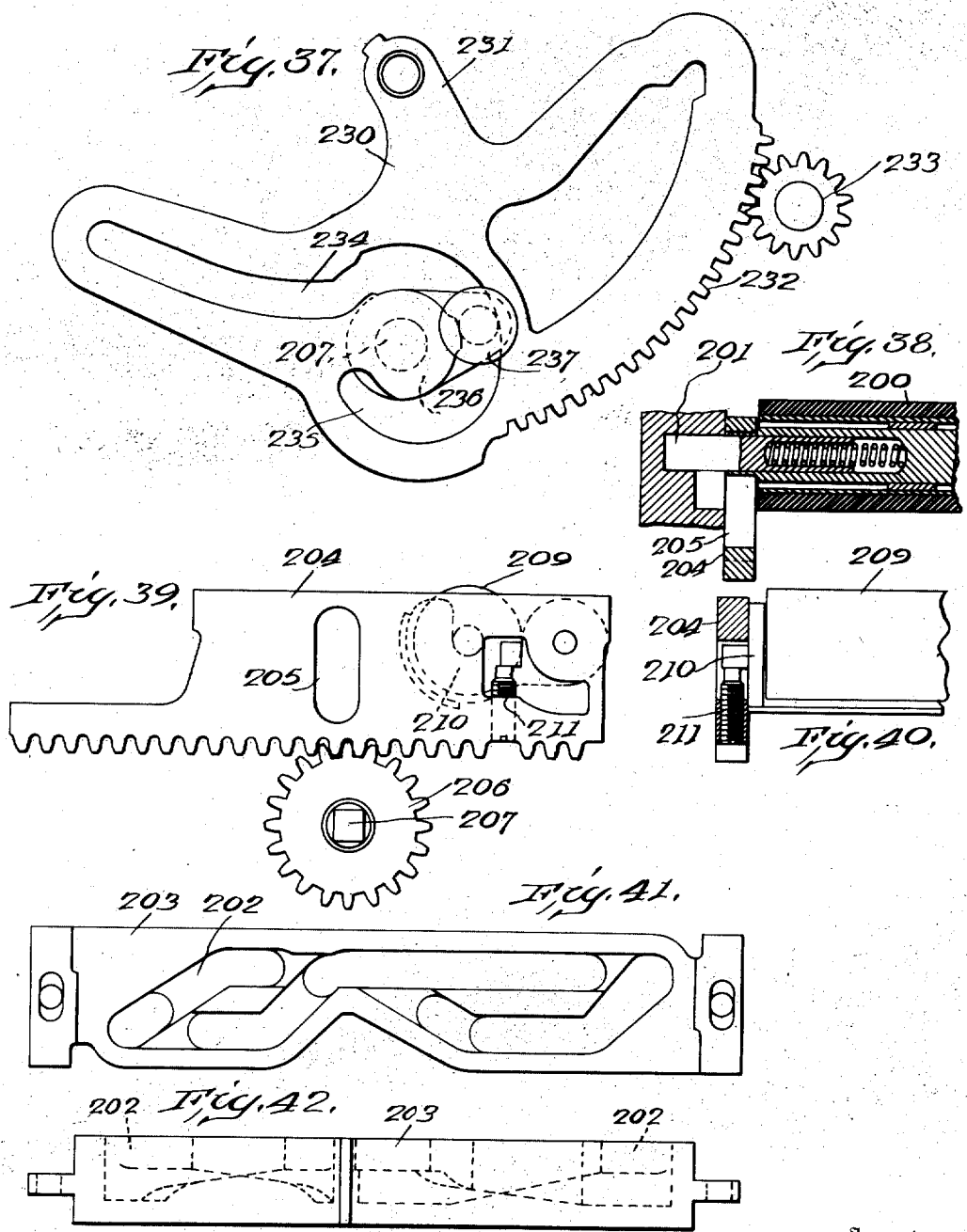

W. I. OHMER, D. B. WHISTLER & J. E. McALLISTER.
REGISTER AND RECORDER.
APPLICATION FILED MAY 3, 1909.

990,666.

Patented Apr. 25, 1911.
16 SHEETS—SHEET 14.

Witnesses
G. Howard Walmsley.
Edward L. Reed.

Inventors
Wilfred I. Ohmer,
David B. Whistler,
John E. McAllister,
By H. A. Toulmin,
Attorney

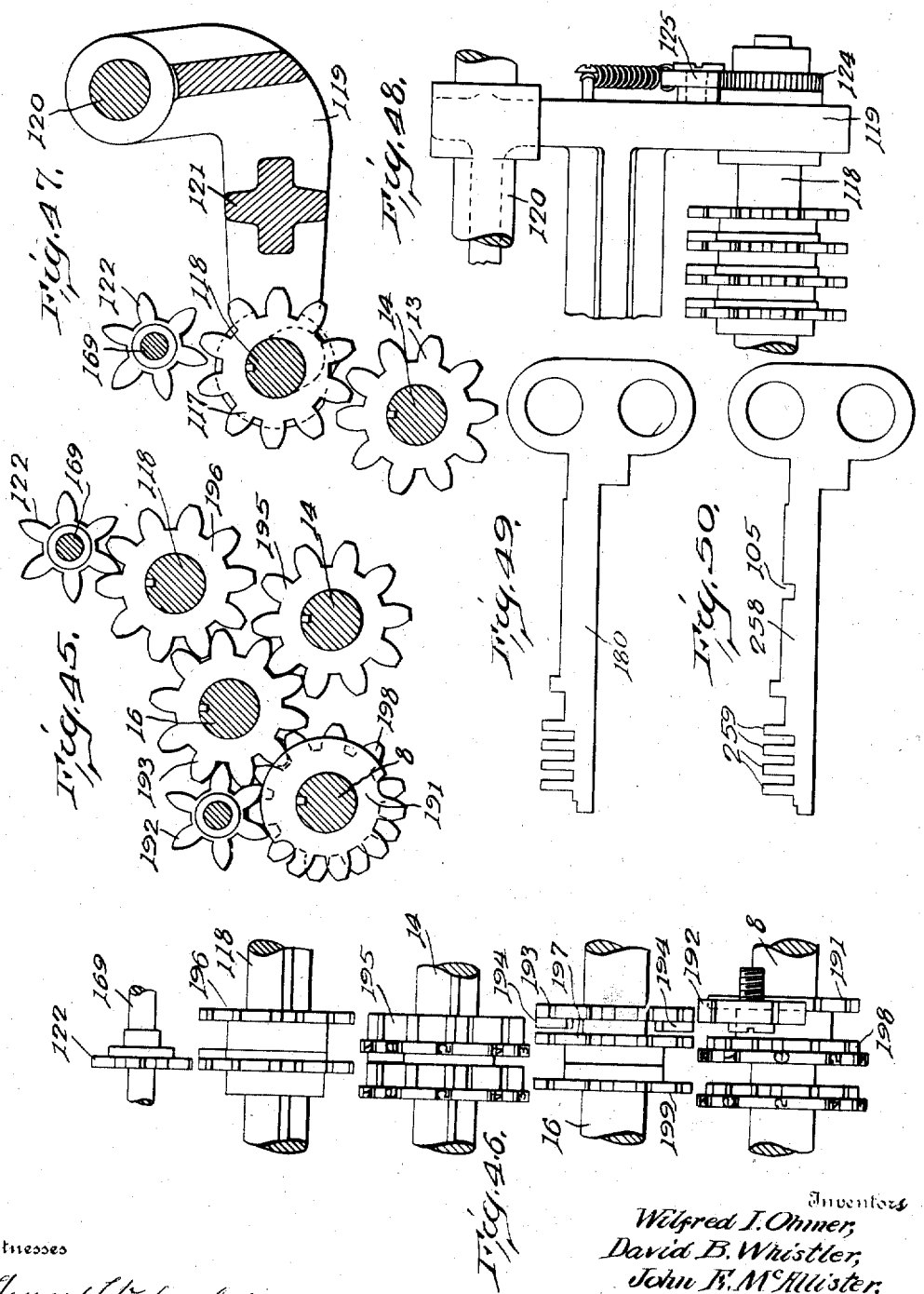

W. I. OHMER, D. B. WHISTLER & J. E. McALLISTER.
REGISTER AND RECORDER.
APPLICATION FILED MAY 3, 1909.

990,666.

Patented Apr. 25, 1911.

16 SHEETS—SHEET 16.

THE CHICAGO CITY RAILWAY COMPANY.
TOTAL RECORD
JAN. 1, 1909.
RECORDER No. 2222.

| DIV. NO | LINE NO. | TOTAL TRIPS | TOTAL CASH | 5¢ FARES | TRANSFERS | 3¢ FARES | PASSES | TOTAL PASSENGERS | REGISTER TOTAL | OPERATOR NO. |
|---|---|---|---|---|---|---|---|---|---|---|
| | | | | | DAILY TOTAL | | | | | |
| 01 | 117 | 08 | 49.75 | 986 | 343 | 15 | 76 | 1620 | 87654 | 0025 |

CAR NO. 490

Fig. 55.

THE CHICAGO CITY RAILWAY COMPANY.
TOTAL RECORD
JAN. 1, 1909.
RECORDER No. 2222.

| DIV. NO | LINE NO. | TOTAL TRIPS | TOTAL CASH | 5¢ FARES | TRANSFERS | 3¢ FARES | PASSES | TOTAL PASSENGERS | REGISTER TOTAL | OPERATOR NO. |
|---|---|---|---|---|---|---|---|---|---|---|
| 01 | 117 | 08 | 28.15 | 557 | 260 | 10 | 34 | 861 | 87654 | 0227 |
| TRIP NO | TRIP CASH | CONSECUTIVE TRIP TOTALS | | | | | | TRIP PASSENGERS | | CONDUCTOR'S NO. |

CAR NO. 490.

| 117 | 04 | 07.50 | 147 | 037 | 05 | 14 | 203 | 0227 |
| 117 | 03 | 06.40 | 128 | 085 | 00 | 05 | 218 | 0227 |
| 117 | 02 | 07.75 | 152 | 066 | 05 | 10 | 233 | 0227 |
| 117 | 01 | 06.50 | 130 | 072 | 00 | 05 | 207 | 0227 |

Fig. 56.

THE CHICAGO CITY RAILWAY COMPANY.
TOTAL RECORD.
JAN. 1, 1909.
RECORDER NO. 2222.

| DIV. NO | LINE NO. | TOTAL TRIPS | TOTAL CASH | 5¢ FARES | TRANSFERS | 3¢ FARES | PASSES | TOTAL PASSENGERS | REGISTER TOTAL | OPERATOR NO. |
|---|---|---|---|---|---|---|---|---|---|---|
| 01 | 117 | 04 | 21.60 | 429 | 283 | 05 | 42 | 759 | 86793 | 1450 |
| TRIP NO | TRIP CASH | CONSECUTIVE TRIP TOTALS | | | | | | TRIP PASSENGERS | | CONDUCTOR'S NO. |

CAR NO. 490.

| 117 | 04 | 04.25 | 085 | 085 | 00 | 10 | 180 | 1450 |
| 117 | 03 | 06.40 | 128 | 071 | 00 | 12 | 211 | 1450 |
| 117 | 02 | 05.15 | 100 | 094 | 05 | 05 | 204 | 1450 |
| 117 | 01 | 05.80 | 116 | 033 | 00 | 15 | 164 | 1450 |

Fig. 57.

Witnesses
G. Howard Walmsley.
Edward ...

Inventors
Wilfred I. Ohmer,
David B. Whistler,
John E. McAllister,
By H. A. Toulmin,
Attorney

UNITED STATES PATENT OFFICE.

WILFRED I. OHMER, DAVID B. WHISTLER, AND JOHN E. McALLISTER, OF DAYTON, OHIO, ASSIGNORS TO THE RECORDING AND COMPUTING MACHINES COMPANY, OF DAYTON, OHIO, A CORPORATION OF OHIO.

REGISTER AND RECORDER.

990,666.  Specification of Letters Patent.  Patented Apr. 25, 1911.

Application filed May 3, 1909. Serial No. 493,586.

*To all whom it may concern:*

Be it known that we, WILFRED I. OHMER, DAVID B. WHISTLER, and JOHN E. McALLISTER, citizens of the United States, residing at Dayton, in the county of Montgomery and State of Ohio, have invented certain new and useful Improvements in Registers and Recorders, of which the following is a specification, reference being had therein to the accompanying drawings.

Our invention relates to registers and recorders, and more particularly to fare registers and recorders, the present invention being in the nature of an improvement upon Patent No. 848,262, granted to Ohmer, Whistler and McAllister March 26, 1907.

One object of the present invention is to provide a machine of this character which will furnish three distinct records, viz., a conductor's trip record or record of the fares received during a single trip of the car, a conductor's total record or record of the total number of fares received during several trips made by a single conductor; and an inspector's record or record which represents the accumulation of all fares received by the several conductors who have been in charge of the car during the day's run or during any other specified time. To carry this object into effect, we provide, in combination with the requisite counting mechanism, a device, which we designate an accumulator, that will accumulate all the transactions registered by the counting mechanism; that will not be affected when said counting mechanism is reset to zero; and that may be actuated to transfer the record, so accumulated in it, to said counting mechanism after said counting mechanism has been reset to zero; and to also provide that such accumulator will be actuated by the actuator for the counting mechanism to cause such accumulator to operate and thereby accumulate all the transactions registered by the counting mechanism.

Another object of the invention is to provide a more simplified and easily manipulated means for imparting an actuating movement to the actuator after the actuator has been moved into position to actuate the counting mechanism.

Another object of the invention is to provide a special means for setting into operative position the gears employed to actuate the total cash counters.

Another object of the invention is to provide means for operating the register from either side thereof; to provide means for utilizing the full movement of the operating mechanism to operate the register; to provide locking means for the printing mechanism independent of the lock for the actuating mechanism; and also to provide means for taking a record from either the detail counters, the total counters or the accumulator and means for identifying the person taking any one of said records.

A further object of the invention is to provide means for so controlling the movement of the several parts of the mechanism that each step in the manipulation thereof to make a record must be performed in its proper order; and further, to provide means for so controlling the movement of the several parts that each must complete its operation before it can be returned to its normal position.

With these and other objects in view our invention consists in numerous organizations of parts and certain novel features, combinations and arrangements hereinafter to be described, and then more particularly pointed out in the claims.

Figure 44:
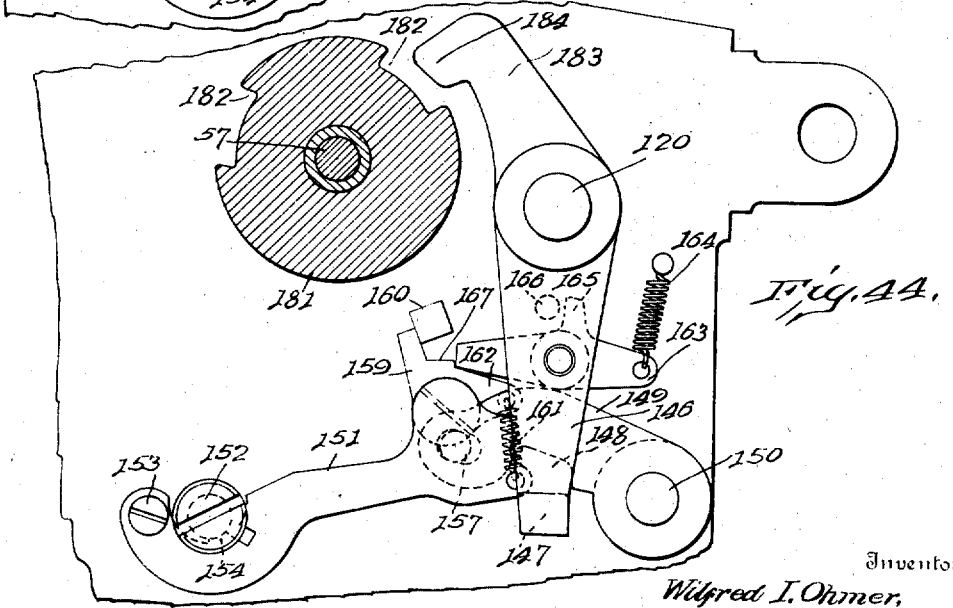

In the accompanying drawings, Figure 1 is a top plan view of a register embodying our invention with the actuating mechanism removed; Fig. 2 is an elevation of one end of the register with the printing mechanism broken away; Fig. 3 is an elevation of the register opposite that shown in Fig. 2 showing a portion of the printing mechanism; Fig. 4 is a transverse sectional view of the register showing a portion of the printing mechanism; Fig. 5 is a front elevation of the register; Fig. 6 is a detail view showing means for locking the accumulator shaft against rotation when in its normal position; Fig. 7 is a detail view showing the ratchet-control for the accumulator shaft; Fig. 8 is a front elevation of the rear counter and the accumulator shaft; Fig. 9 is a top plan view of the rear portion of the register showing the actuating mechanism; Fig. 10 is a transverse sectional view, taken on the line $x$ $x$ of Fig. 9; Fig. 11 is a detail view of the pawl and ratchet mechanism forming part of the operating mechanism for the register; Fig. 12 is a detail view of the double rack bar; Fig. 13 is a detail view of the locking pawl for the slide bar; Fig. 14 is a detail view of the overthrow stop for the vertical shaft of the operating mechanism; Fig. 15 is a sectional view, taken on the line y y of Fig. 9; Fig. 16 is a detail view of a portion of the slide bar showing the stops to limit the movement thereof; Fig. 17 is a top plan view of the key-controlled lock for the accumulator; Fig. 18 is a rear elevation of the mechanism shown in Fig. 17; Fig. 19 is a top plan view of the mechanism for locking the actuator in its operative position; Fig. 20 is a sectional view of a portion of the register showing the actuating mechanism for the total cash counters; Fig. 21 is a detail view of the indicator shaft and the cam mounted thereon; Fig. 22 is a development of the cam shown in Fig. 21; Fig. 23 is a sectional view of the cam; Fig. 24 is a front elevation of the mechanism shown in Fig. 19; Figs. 25 and 26 are detail views showing the car numbering key in position; Fig. 27 is a detail view of that key; Fig. 28 is a detail view of the mechanism for locking the resetting shaft against movement when the actuator for the total cash counters is in operative position; Fig. 29 is a detail view of a device for locking the resetting shafts against movement while the actuating bar is being actuated and for locking the actuating bar against movement while either of the resetting shafts is being actuated; Fig. 30 is a sectional detail view of the identifying means showing the key in position; Fig. 31 is a detail view of one of the printing disks of the identifying mechanism; Fig. 32 is a detail view of the lock for retaining the accumulator in its elevated position; Fig. 33 is a detail view of the mechanism for retaining the accumulator in its operative relation with the rear counters; Fig. 34 is a detail view of a cam-operated pitman for controlling the overthrow-pawl for the passenger indicator; Fig. 35 is a sectional view of the cam mechanism for operating the pitman of Fig. 34; Fig. 36 is a top plan view of the mechanism shown in Fig. 34; Fig. 37 is a detail view of the cam plate forming a part of the paper feed mechanism; Fig. 38 is a sectional detail view of the printing roller; Fig. 39 is a fractional detail view of the carriage in which the printing roller and inking roller are mounted; Fig. 40 is a fractional detail view of the inking roller; Figs. 41 and 42 are detail views of the cam plates forming guides for the printing roller; Figs. 43 and 44 are detail views of the key-controlled locking mechanism for the accumulator; Fig. 45 is a detail view of the trip number counting mechanism; Fig. 46 is a conventional view showing the gearing of Fig. 45 in extended position; Fig. 47 is a detail view of the accumulator and its supporting carriage; Fig. 48 is a detail of one end of the accumulator shaft showing a top view of the mechanism shown in Fig. 7; Fig. 49 is a detail view of the inspector's key; Fig. 50 is a detail view of the conductor's key; Fig. 51 is a vertical sectional view of the locking means for the printing mechanism; Fig. 52 is a detail view of the toothed wheel and pawl to prevent the return of the printing mechanism to normal position before it has completed its operation; Fig. 53 is a sectional view, taken on the line z z of Fig. 51; Fig. 54 is a detail view of the socket wrench or key for actuating the printing mechanism; Fig. 55 is a view of the record taken from the accumulator; and Figs. 56 and 57 are detail views of the record taken from the totalizing counters and from the detail counters.

In these drawings we have illustrated and will now proceed to describe only so much of the machine shown and described in the above mentioned patent as is necessary to the understanding of the present invention.

The present machine is similar in general appearance to the machine of the patent referred to and the frame of the present machine is substantially the same as the frame of the machine of that patent and comprises end members 1 and 2 connected one to the other by substantially parallel bars 3, 4, 5 and 6, each of which forms a part of the support for the several parts of the machine. The entire machine is, when in service, inclosed in a casing or cabinet, but inasmuch as this casing, as a whole, is not a part of the present invention, it is not here shown or described in detail and it is sufficient to say that the casing is provided with the necessary openings for the locking, printing and resetting keys and with sight openings for the indicators, but otherwise completely incloses the operating mechanism of the register, and, when locked in position thereon, renders it impossible to gain access to this mechanism except in the prescribed manner.

A plurality of groups of counters 7 are mounted in the frame some distance above the bottom thereof and are preferably arranged in longitudinal alinement upon a resetting shaft 8 which is journaled in the end members of the frame. The counters 7 may be of any suitable character. In the present instance we have shown the same as printing counters, each of which comprises a rotatable member or disk 9 which is provided on its periphery with numerals of such a construction that a record can be printed therefrom. Each counter also comprises an actuating member, such as a toothed-gear 10, which is rigidly secured to the disk 9 so that the disk and the gear form in effect a single member or counter. These counters are loosely mounted on the resetting shaft and are held against longitudinal movement thereon. Each group of counters is provided with suitable transfer gears 11 having locking pawls 12 mounted in the frame member 3, and the arrangement and operation of the counters is a familiar one and needs no detailed description here. The number of groups of counters carried by the shaft 8 may be determined according to the number of kinds of fares to be registered. The present machine is adapted to register and record four kinds of fares, namely, 5 cent, transfers, 3 cent and passes. In addition to the four groups of counters to register these fares there is a group of counters adapted to register the total amount of cash received, a group to register the total number of fares of all kinds or the total number of passengers, and also a trip counting group which counts the trips made by the car and prints the number of each trip upon the record for that trip. These counters form the detail or trip counters and register and record the number of fares taken during any one trip, and, at the end of that trip, are reset to zero. Immediately in the rear of the trip counters is a second set of counters 13 mounted on a resetting shaft 14. These counters are similar to those before described and comprise the disk 9 and the gear 10 and are also provided with transfer gears 11 having locking pawls 12, which pawls are mounted in the frame member 4. This second set of counters comprises a plurality of groups arranged in the same manner as the trip counters with the addition of a register total or a group of counters to register the total number of fares received while the particular register has been in service, or for any other specified time. This second set of counters are the totalizing counters and are so arranged as to be actuated each time the trip counters are actuated to register a unit. The trip counters, however, may be reset to zero independently of the totalizing counters, and, consequently, the totalizing counters will maintain a record of all the fares registered during the several trips or until the totalizing counters have been reset to zero.

There are also provided printing wheels or type disks for printing on the record a designation of the line and the division of the railway upon which the car is operated. These designations are, in the present instance, made by means of line and division numbers, and, to this end, the rear or totalizing counter shaft 14 is provided with two groups of type disks, one to designate the line number and the other the division number, as shown at 261 and 262, respectively. These type disks are rotatably mounted on the rear counter shaft 14 and are actuated from the front of the register in any suitable manner. The operating mechanism for the type disks for designating the line and division numbers are the same and we will, therefore, describe only the operating mechanism for the division number disks and it will be understood that this operating mechanism is duplicated for the line number disks. This mechanism, in the present instance, consists of a plurality of indicators or disks 263 rotatably mounted on the indicator shaft 71. Each of these disks is provided with a gear 264 which operates through a suitable train of gearing to rotate the type disks mounted on the rear counter shaft. These indicator disks 263 are provided with designations or numerals corresponding to those on the type disks, and, by moving the designations on the indicator disks into a predetermined position, the type disks will be adjusted to print the desired designation, and further, the indicator disks will indicate the division number. The casing, which is not here shown, may be provided with an opening having a hinged closure to permit access to the indicating disks.

A suitable actuator is provided for actuating the desired group of counters to register the particular fare which has been received. This actuator, in the present instance, consists of a two-toothed gear 15 mounted on a shaft 16 which extends substantially parallel with the resetting shafts 8 and 14 and is journaled in the end members 1 and 2 of the main frame. This two toothed gear or actuator is slidably mounted on the actuating shaft 16, but is held against rotation thereon. Thus, the actuator may be moved longitudinally of the rows of counters to bring the same into operative relation with the desired groups of counters and the shaft 16 then rotated through half a revolution to cause the actuator to actuate the particular groups of trip counters and totalizing counters with which it has been moved into operative relation. This two-toothed gear is preferably so arranged that the two teeth thereof are normally in the same vertical plane. Consequently, the movement of the gear through a half revolution will cause each of the teeth to engage the actuating gear of the unit counter of one of the groups of counters. Suitable means are provided for shifting the actuator 15 longitudinally of the shaft 16 to bring the same into operative relation with the desired group of counters. This means is here shown as comprising a screw-shaft 17 arranged above and extending substantially parallel with the actuating shaft 16. The screw-shaft preferably comprises an enlarged central portion provided with a spiral groove or thread 18 and has its end portions reduced and journaled in the end walls 1 and 2 of the main frame.

Both ends of the shaft 17 extend beyond the corresponding ends of the main frame and beyond the casing which incloses the register and either end may be connected to suitable operating mechanism, which is arranged within reach of the conductor. A carriage 20 is mounted on the shaft 17 and has an inwardly extending projection or pin 21 which extends into the groove 18. This carriage has a depending portion 22 provided with a yoke 23 which engages a grooved hub 24 carrying the actuator 15. The yoke 23 holds the carriage 20 against rotary movement, and, consequently, the rotation of the shaft 17 will cause the pin 21 and carriage 20 to move longitudinally of that shaft, thereby carrying the yoke 23 and the actuator 15 longitudinally of the actuating shaft 16. The conductor's actuating mechanism, above mentioned, is provided with a suitable indicator to enable the conductor to know when the actuator has been moved into operative relation with the desired group of counters.

Means are provided for rotating the actuating shaft 16 to move the actuator 15 through one half of a revolution to cause the same to actuate the counters. To this end we have provided the shaft 16 with a gear 25 which is located preferably near the end member 1 of the frame and meshes with an idle gear 26 mounted on a stud 27 carried by the member 1 of the frame, which, in turn, meshes with a pinion 28 mounted on a driving shaft 29 which extends substantially parallel to the shafts 16 and 17 and is operatively connected with suitable driving mechanism. The ratio of the gears is such that for each complete rotation of the shaft 29 the shaft 16 will be rotated through half a rotation. The driving mechanism for the shaft 29 may be of any suitable character, but preferably comprises a slidable driving member, the reciprocation of which will impart the desired movement to the actuating shaft 16. In the present instance, we have provided the driving shaft 29 with a bevel gear 30 which meshes with a second bevel gear 31 carried by a shaft 32 arranged at substantially right angles to the shaft 29 and here shown as journaled in brackets 33 and 34 carried by the frame member 6. Rigidly secured to the shaft 32 and spaced some distance apart are two ratchets 35, each having two teeth arranged on diametrically opposite sides of the shaft 32.

Loosely mounted on the shaft 32, above and below the respective ratchets 35, are pinions 36, each carrying two pawls 37, which pawls are preferably mounted on the pinions 36 by means of plates 40 rigidly secured to the pinions and moving therewith. The pawls 37 are pivotally mounted between their ends on the plates 40 and have their rear ends apertured to receive pins 38, about which are coiled springs 39 which tend to move the pawls 37 about their pivotal centers and to hold the noses thereof against the respective ratchets. The pinions 36 mesh with and are actuated by rack bars 41 which are arranged on opposite sides of the shaft 32 and form part of a slide bar 42. This slide bar comprises the two rack bars 41 and two end members 43 which extend beyond the opposite end members 1 and 2 of the main frame and are slidably mounted in guideways formed in those end members. The rack bars 41 have their ends turned inwardly, as shown, and connected to the upper and lower sides of the members 43, thus spacing the rack bars some distance apart and permitting the same to be arranged on opposite sides of the shaft 32 and also arranging the same in different horizontal planes and enabling them to mesh with the pinions 36 which are arranged one above the other on the shaft 32. These two sets of pawls and ratchets are so arranged that when the slide bar is moved in one direction, one set of pawls will engage their corresponding ratchet and the shaft will be moved in one direction, the other set of pawls riding over their ratchet, while, on the opposite movement of the slide bar, the operation of the pawls will be reversed and the movement of the shaft continued in the same direction. Thus, the reciprocation of the slide bar moves the shaft 32 continuously in one direction.

In order that the rotation of the shaft 32 and the actuating shaft which is operated therefrom may stop at exactly the proper time, we have provided suitable stops to prevent the overthrow of the shaft 32. To this end the members 43 of the slide bar are provided with inwardly extending projections 44 which are so arranged that, when the slide bar is moved to either limit of its movement, one of the projections 44 will lie in the path of a cam 45 which is rigidly secured to the shaft 32. This cam is provided with a straight face which is so arranged with relation to the stops 44 that, when moved from its position in engagement with one of said stops to its position in engagement with the other stop, the shaft 32 will have rotated exactly through an arc of 180 degrees. The pawls 37 are shown of such a length that, when in their normal or idle position, their noses are some distance removed from the respective teeth of the ratchets 35. Consequently, the pawl and slide bar 42 may be moved some little distance before the shaft 32 will begin to rotate, this movement being sufficient to carry the stop, which is in engagement with the cam 45, out of the path of that cam before the movement of the shaft 32 and the cam begins. Means are also provided for obliging the conductor to move the slide bar to the limit of its movement on each operation thereof and thus rotate the shaft 32 through a complete rotation. To this end a bracket 46 is mounted on the frame member 6 and extends inwardly therefrom, this bracket, being, in the present instance, shown as formed integral with the frame member. The inner end of the bracket 46 is provided with a slideway 47, within which one of the members 43 of the slide bar is free to reciprocate. That portion of the member 43 which is adapted to move through the slideway is toothed, as shown at 48. A pawl 49 is arranged in the guideway 47 near the inner edge of the member 43 of the slide bar and is preferably mounted on a pin 50 which is journaled in the bracket 46 above and below the slideway 47. The upper end of the pin 50 extends above the bracket 46 and has rigidly secured thereto an arm 51 arranged substantially parallel with the pawl 49 and having secured thereto one end of a spring 52, the opposite end of which is secured to the bracket 46, as shown at 53. This spring tends to hold the arm 51 and pawl 49 in a position at substantially right angles to the direction of the length of the member 43. The distance from the pivotal center of the pawl 49 to the inner end of that pawl is greater than the distance from the pivotal center of the pawl to the base of the teeth 48 when in the nearest position to the pivotal center of the pawl. Consequently, when the pawl is in engagement with one of these teeth, it is turned at an acute angle to the direction of the length of the member 43 and is held in engagement with the teeth by the spring 52. The member 43 is provided at each end of the toothed portion 48 with recesses 54 which are of such a depth that the rear wall thereof is farther removed from the pivotal center of the pawl 49 than is the rear end of that pawl. Consequently, the pawl is free to move in either direction about its pivotal center when lying opposite one of the recesses. Thus, it will be seen that, when the slide bar is moved in one direction, the pawl 49 will engage the first tooth of the member 43 and will ride over the same, and that, after it has moved beyond the first tooth it will be in position to engage that tooth and lock the rack against reverse movement. When the slide bar has been moved to the limit of its movement in the direction in which it was first moved, the pawl 49 will enter the recess 54 at the opposite end of the rack 48 and will be free to turn about its pivotal center. As the bar is moved in the opposite direction the pawl will ride over the teeth and lock the slide bar against movement in the same manner as when the bar was moved in the first-mentioned direction. This construction makes it absolutely necessary that the slide bar shall be moved to the limit of its movement in either direction, before its direction of movement can be reversed. Suitable means are also provided for positively limiting the movement of the slide bar, and, in the present instance, we have shown one of the members 43 of that bar as provided with stops 43ª arranged above and below the same and adapted to engage the bracket 46 within which the slide bar is mounted. We have here shown and described the slide bar 43 as provided with two racks and adapted to actuate the shaft 32 upon both movements of the slide bar, thereby utilizing the full movement of the slide bar to operate the register. In this manner we are able to actuate the counters at a slow speed, thus minimizing the danger of the counters overthrowing, and also to operate the register with greater ease. It will be readily apparent, however, that the device could be readily adapted to accomplish the complete rotation of the shaft 32 by the movement of the slide bar in one direction, thus enabling the second rack bar and its coöperating parts to be dispensed with.

Means are provided for taking a record from either the front or rear counters and this means preferably consists of printing mechanism similar to that shown and described in Patent No. 764,494, granted to W. I. Ohmer July 5, 1904, and in Patent No. 839,630, granted to Ohmer, Hill, Whistler and McAllister Dec. 25, 1906. This printing mechanism *per se* is not a part of the present invention and we have, therefore, shown and described only so much of the same as is necessary to an understanding of its operation and of the manner in which it coöperates with other parts of the machine. As here shown, the mechanism comprises a printing roller 200 movably mounted beneath the printing counters and adapted to be moved across the printing faces of those counters. In the present instance, this printing roller is provided at each end with a projecting pin or shaft 201 adapted to enter cam grooves 202 in plates 203 carried by the end members of the main frame. There are two sets of these cam grooves arranged at the front and rear ends of the plates. The front grooves are so arranged that when the shafts of the printing roller are caused to travel through the same they will cause the roller 200 to contact with the front row of printing counters. The cam grooves at the rear ends of the plates 203 are arranged to bring the printing roller into contact with the rear row of printing counters. Suitable means are provided for so moving the printing roller. This means preferably comprises a carriage consisting of toothed plates or rack bars 204 slidably mounted in the end members of the main frame between the cam plates 203 and the adjacent ends of the printing roller, each plate being provided with a vertical slot 205 through which the shaft or pin 201 of the printing roller extends. The slots 205 are of such a size as to permit the roller to move vertically, but to hold the same against any longitudinal movement relatively to the rack bar or toothed plate 204. Pinions 206 are mounted on a shaft 207 and adapted to mesh with the rack bars at the opposite ends of the main frame. The shaft 207 is provided with a squared head at one or both ends thereof to enable the same to be actuated by means of a socket wrench or key 208. Thus, it will be apparent that the rotation of the shaft 207 in one direction will cause the carriage to move forwardly, thereby carrying the printing roller into contact with the front counters, and the rotation of the shaft in the opposite direction will cause the printing roller to be brought into contact with the rear printing counters. An inking roller 209 is supported at its opposite ends in the toothed plates or rack bars 204 and is so arranged that it will be brought into engagement with the type wheels or printing disks before the printing roller comes into contact therewith. In the present instance the shaft of this inking roller is journaled in movable bearings 210 which are held in their adjusted position by means of a set screw 211. This printing mechanism is normally locked against movement, to prevent its being actuated either by the vibrations of the car upon which the register is mounted, or by any unauthorized person. As here shown, this is accomplished by locking the actuating shaft 207 against movement, and, to this end, we have provided the outer casing or cabinet 212, which surrounds the register and which is provided with an opening 213 through which the end of the shaft 207 projects, with an inwardly extending boss 214 surrounding the opening 213 and having a notch 215 formed in the inner edge thereof. A collar 216 is slidably mounted in that portion of the shaft 207 lying between the cabinet or casing and the end of the main frame. This collar is held against rotation, preferably by means of a spline 217. A spring 218 is coiled about the shaft 207 and has one end in engagement with the collar 216, thereby tending to force the same outward. The collar 216 is provided with a projection 219 adapted to enter the recess 215 and the spring 218 tends to hold this projection normally within said recess or notch. Consequently, the shaft 207 is normally locked against movement. The outer face of the cabinet is provided with a plate or disk 220 having a central opening 221 coincident with the opening 213 in the end of the cabinet. This disk has a radially arranged tooth or projection 222. The key 208 is provided with an enlarged head 223 of a diameter slightly less than the diameter of the openings 221 and 213 formed in the disk 220 and the casing 212, respectively. This enlarged head is provided with a longitudinal groove 224 adapted to receive the tooth or projection 222 and thereby enable the wrench to be inserted in the openings and brought into operative relation with the squared head of the shaft 207. As this key is moved inwardly the head thereof comes into contact with the collar 216 and moves the same inwardly a distance sufficient to withdraw the projection 219 from the notch 215. When the key has been inserted a distance sufficient to accomplish this purpose the head 223 has been moved beyond the disk 221, and, consequently, the key and the shaft 207 may be rotated to actuate the printing mechanism. As soon as the printing mechanism has been returned to its normal position and the key 208 withdrawn the spring 218 returns the collar 216 to its normal position, again locking the shaft against movement.

In order to oblige the operator to move the printing mechanism through a complete operation we have mounted on the shaft 207 close to the end member of the main frame a mutilated ratchet wheel or toothed disk 225. The teeth of this toothed disk are divided into two groups and these groups are separated by clearance spaces 226 and 227, these clearance spaces being in the form of notches or recesses of a depth somewhat greater than the depth of the teeth of the toothed disk. A pawl 228 is pivotally mounted on the end member of the main frame near the toothed disk and a spring 229 serves to hold the same normally in a position substantially radial to the toothed disk. The distance between the end of the pawl 228 and the pivotal center thereof is somewhat greater than the distance between the base of one of the teeth of said disk and the pivotal center of the pawl when said tooth and said pawl are in substantial alinement. The toothed disk is rigidly mounted on the shaft 207, and, when that shaft is rotated to move the printing roller in a rearward direction, the teeth of the larger group will engage the pawl and move the same about its pivotal center to a position tangential to the disk. In this position the pawl will ride over the teeth as long as the disk is moved in the direction in which it was started, but will engage the teeth and prevent the movement of the disk in the opposite direction. When the shaft has been rotated a distance sufficient to complete the rearward portion of the operating movement of the printing roller, the end of the pawl will enter the recess 227 which is of sufficient depth to permit the pawl to move about its pivotal center. On the movement of the shaft in the reverse direction, to return the printing roller to its normal position, the pawl will ride over the teeth of the same group in the opposite direction and will lock the same against movement in a direction to move the printing roller rearwardly. When the shaft is rotated to move the printing roller forwardly the pawl will ride over the teeth of the smaller group and the locking effect will be the same as above described. Thus, it will be necessary, when printing either from the front or rear group of counters, to complete the printing operation before the printing roller can be returned to its normal position.

Both the front and rear counters are locked against resetting until the printing mechanism has first been operated to print a record from the counters which it is desired to reset, thus preventing the count from being destroyed before a record of the same has been taken. This locking mechanism is, in both instances, preferably controlled by the operation of the paper feed mechanism. In the present instance we have shown the machine as having a cam plate 230 arranged at one end thereof for operating a paper feed. This cam plate is provided with an arm 231 which is pivotally connected to the end member 2 of the main frame and forms a pivotal support for the cam plate. This cam plate is substantially segmental in shape and is provided on its outer edge for a portion of its length with teeth 232, thus forming a rack bar adapted to actuate a gear 233 operatively connected to one of the rollers comprising the paper feed mechanism. The paper feed mechanism forms no part of the present invention and is similar to that shown and described in the above mentioned Patent No. 839,630 and we have, therefore, here shown and described only so much of that mechanism as is necessary to an understanding of the operation of the cam plate. This cam plate is provided in that end portion opposite the portion carrying the teeth 232 with two cam slots 234 and 235, the slot 234 being of a greater length than and different shape from the cam slot 235. The actuating shaft 207 for the printing mechanism terminates between the two cam slots and is provided with a crank arm 236, having at its outer end a projection or guide roller 237 adapted to move in the cam slots. This guide roller or projection lies normally at the point of juncture of the two slots, and, when the actuating shaft is rotated in either direction to move the printing roller over either row of counters, the cam plate 230 will be moved in a direction to actuate the gear 233 of the paper feed mechanism. The resetting shaft 8 for the front row of counters has rigidly mounted thereon a disk 238 which is provided with a radial projection 239 and a lateral projection 240. A lever 241 is pivotally mounted between its ends on the frame member 2 and is provided at one end with a nose or projection 242 adapted to engage the radial stop 239 carried by the disk 238. The opposite end of the lever 241 has pivotally mounted thereon a second lever 243, one end of which extends to a point near the disk 238 and is connected to that portion of the lever 241 having the projection 242 by means of a spring 244, thus tending to draw the adjacent ends of the two levers toward each other and retaining the projection 242 of the lever 241 normally in the path of the stop or projection 239 carried by the disk on the resetting shaft. The other end of the lever 243 is provided with a laterally extending projection or toe 245 which extends into an opening formed in the cam plate 230 and bears against the inner edge of the toothed portion of that rack, thereby tending to retain the opposite end of the lever in an elevated position against the tension of the spring 244.

In the operation of the printing mechanism, to print from the front row of counters the guide roller 237 will enter the short cam slot 235. The shape of this slot is such that the first movement of the guide roller will move the cam plate in such a manner as to cause the rack bar carried thereby to move downwardly a short distance and the continued movement of the guide roller will cause the cam plate to move in the opposite direction a distance sufficient to feed the desired amount of paper. The first downward movement of the rack bar or toothed portion of the cam plate moves the lateral projection 245 on the lever 243 into alinement with a recess 246 formed in the cam plate near the upper end of the rack bar, thereby permitting the tension of the spring 244 to move the lever about its pivotal center and causing the projection 245 to enter the recess 246. The movement of the cam plate in the opposite direction to effect the feeding of the paper causes the lever 243 to be moved upwardly as a whole, thereby moving the lever 241, which is connected thereto, about its pivotal center and carrying the projection 242 out of the path of the stop 239 carried by the disk on the resetting shaft and permitting the resetting shaft to be rotated in a direction to reset the counters to zero. The movement of the lever 243 about its pivotal center has caused that end of the same lying adjacent to the disk 238 to extend into the path of the lateral projection 240 carried by said disk. The movement of the disk 238 as the shaft is actuated to reset the counters to zero causes the projection 240 to engage the lever 243 and move the same about its pivotal center, thus moving the toe or projection 245 out of the recess 246 in the cam plate and permitting the parts to return to their normal position with the projection 242 of the lever 241 in the path of the stop 239.

The locking means for the rear counter shaft consists of a bell crank lever 247 pivotally mounted on the frame member 2 and having one arm adapted to extend into the path of the projection or nose 248 carried by a disk 249 mounted on the end of the resetting shaft for said rear row of counters. The other end of the lever is provided with a recess 250 near the outer end thereof. A trip lever 251 is pivotally mounted on the frame member 2 at a point beneath the lever 247 and is provided at one end with a projection 252 lying normally in the path of a lug or stop 253 carried by the disk 249. The lever 251 extends beyond the projection 252 and into the path of a projection 254 extending from the edge of the arm 231 which carries the cam plate 230. The opposite end of the lever 251 is normally in engagement with one end of the lever 247. A spring 255 connects the levers 251 and 247 and holds these parts normally in engagement. When the cam plate is moved about its pivotal center the stop 254 will engage the end of the lever 251 and move the projection 252 out of the path of the stop 253 carried by the disk 249. This movement carries the opposite end of the lever 251 into alinement with the recess 250 and the spring 255 causes the lever 247 to move downwardly until the end of the lever 251 enters the recess 250, thereby locking the lever 251 in a position with the lug 252 out of the path of the stop 253. The rotation of the disk 249 when the resetting shaft 14 is operated will cause the nose 248 carried thereby to engage the end of the bell crank lever 247 opposite the recess 250 and move the recessed end thereof out of engagement with the adjacent end of the lever 251, thereby permitting the spring 255 to move these parts into their normal or locked position. Thus, it will be seen that when a record has been compiled by the counters the data of this record cannot be destroyed until the printing mechanism has first been operated; and further, that the printing mechanism is so controlled that a complete operation thereof must be made before it can be returned to its normal position. Consequently, a record must be printed from the counters before they can be reset to zero. It will be obvious, however, that duplicate records can be printed from the counters, as the printing mechanism is free to be operated as many times as may be desired before the counters are reset to zero.

It is desirable that some means should be provided to insure that the actuator 15 is in proper relation with the counters to be actuated and to lock the same in that position until the operation of the driving mechanism has been completed. To accomplish this we have mounted on that end of the screw-shaft 17, which extends beyond the end member 1 of the frame, a pinion 55 which meshes with a gear 56 mounted on a stud 57 fixed in the end member 1 of the frame. A pinion 58 is also mounted on the stud 57 and is rigidly secured to the gear 56 and rotates in unison therewith. The toothed lower edge of a bar 59 meshes with the pinion 58 and the opposite end of the bar is provided with a longitudinal slot 60 adapted to receive a pin 61 which forms a guide for the bar 59, the bar being held thereon by a flange 62 secured to the outer end of the pin 61. The pinion 58 also has a flange 63 extending outwardly to a point slightly beyond the edges of the teeth thereof. This flange serves to hold the bar 59 against lateral movement relatively to the pinion. A flanged roller 64 is mounted on the end member 1, engages the upper edge of the bar 59 and has its flange extending along the side thereof, thereby holding the bar 59 against lateral movement and retaining the same in mesh with the pinion 58. The forward or slotted end of the bar 59 is somewhat greater in width than the opposite end thereof and is provided with a series of recesses 65 having their side walls converging downwardly. A forwardly extending dog 66 is pivotally mounted on the end member 1 of the main frame and is provided at its forward end with a nose 67 having its opposite sides beveled to correspond to the converging sides of the recesses 65 and adapted to fit snugly within any one of those recesses. The dog 66 is provided with an upwardly extending portion carrying a roller 68, which, when the nose 67 of the dog is in its elevated position, will lie in a recess 69 formed in the slide bar 42 beyond the end member 1. The greatest depth of this groove is at that end thereof nearest the outer end of the slide bar and its rear wall is inclined toward the forward edge of the slide bar. This rear wall is also preferably inclined upwardly and rearwardly to correspond to the inclination of the roller 68 when the nose 67 of the dog is raised. The dog 66 may be so mounted on the end frame that the nose will normally be supported out of engagement with the recesses 65 or it may be so balanced that the nose will normally engage these recesses, the beveled sides of the dog permitting the bar 59 to be moved freely in a longitudinal direction so long as the recess in the slide bar 42 lies opposite the roller 68. When the slide bar 42 is moved outwardly, the inclined wall of the recess 69 moves the dog about its pivotal center and forces the nose 67 thereof into full engagement with one of the recesses 65 and the position of the roller 68 relative to the forward edge of the slide bar 42 is such that the dog will be locked in this position so long as the slide bar 42 is out of its normal position. The recesses 65 in the bar 59 correspond in number to the number of different classes of fares to be registered, i. e., the number of different positions into which it is desired to move the actuator 15, and these recesses are so arranged relatively to the nose 67 of the dog and to the actuator that, when the nose 67 is in full engagement with one of the recesses 65, the actuator will be in its exact operative relation to the corresponding group of printing counters.

The toothed lower edge of the forward portion of the bar 59 meshes with a pinion 70 rigidly secured to the outer end of an indicator shaft 71, upon which are mounted the several indicators, these indicators being substantially the same and being operated in substantially the same manner as are the indicators in the above mentioned Patent, No. 848,262. The fare indicator 72 is rigidly secured to the shaft and rotates therewith, the arrangement of the shaft relatively to the setting mechanism for the actuator being such that this indicator will at all times indicate the position of the actuator relative to the several groups of printing counters. The passenger counters 73 are operated by a train of gearing in the same manner as in our former patent, above mentioned, but the mechanism for preventing the overthrow of the wheels comprising this indicator is slightly different and is here shown as comprising a pawl 74 having a nose adapted to extend into the path of projections 75 carried by each of the wheels comprising the indicator and mounted on a shaft 76 extending longitudinally of the indicator 71. The shaft 76 is provided near the end member 1 of the frame with a crank arm 77, which, in turn, is pivotally connected to one end of a crank or pitman 78, the opposite or inner end of which is bifurcated and extends on the opposite sides of the driving shaft 29. Rigidly mounted on the shaft 29 near the bifurcated end of the pitman 28 is a disk or plate 187 provided, in the face adjacent to the pitman, with a cam groove 188. A projection or pin 189, preferably provided with a roller 190, extends into the cam groove 188 and serves to impart movement to the pitman when the disk 187 rotates. The cam groove 188 is shaped to positively move the shaft 76 and the pawl 74 so that the pawl will be moved into and out of the path of the projection 75 at the proper time.

The 3 cent or 5 cent fare counters count the number of fares of each kind received, but it is also desirable that the total amount of cash received should be recorded, and, for this purpose, we have provided means for adding to a group of total cash counters the number of units corresponding to the number of cents in each cash fare received. For this purpose we have provided a group of total cash counters 7a and 13a respectively, on both the trip and totalizing counters. These total cash counters are the same as the other cash counters with the exception that the unit counter of each group is provided with two actuating gears, 10, instead of one, these gears being rigidly connected one to the other by means of a hub or sleeve 80. A special actuator is mounted on the actuating shaft 16 and comprises two gears 81 and 82, the first having ten teeth and the second having six teeth, these gears being preferably rigidly connected one to the other and movable in unison. These gears are mounted to move longitudinally of the shaft 16, but not to rotate therewith, and, to this end, they are mounted on one end of a hub or sleeve 83 having an annular groove 84. Means are provided for moving this sleeve or hub longitudinally of the shaft 16 to bring one of the gears 81 or 82 into position to engage one of the gears of the group of total cash counters. The actuating gears 81 and 82 are arranged normally to lie between the two gears of the unit counter of the group, and, when moved in one direction, the teeth of the actuating gear 81 will mesh with the teeth of the counter gears of both the trip and totalizing groups. When the hub 83 is moved in the other direction, the six toothed gear 82 will be moved into position to engage the teeth of the counter gears in both the trip and totalizing groups. In the first instance the half rotation, which is imparted to the actuating shaft 16, will add five units to each group of counters, while, in the second instance, the actuation of the shaft 16 will add three units to each group of counters. The means for controlling the movement of the sleeve 83 and the actuating gears carried thereby preferably consists of a lever 85 mounted on an arm 86 carried by the frame member 3. This lever is provided at one end with a projection 87 lying normally within the groove 84 in the hub 83 and is provided at its opposite end with a projection 88 lying normally within a cam groove 89 formed in a collar 90 rigidly secured to the indicator shaft 71. This cam shaft, the development of which is shown in Fig. 22, is so arranged that when the indicator 72 has been moved into a position to indicate a 5 cent fare, the lever 85 will move the hub 83 in such a direction as to bring the actuating gear 81 into operative relation with the two groups of total cash counters, and, when the indicator has been moved into a position to indicate a 3 cent fare, the actuating gear 82 will have been moved into operative relation with said groups of counters.

Should an attempt be made to reset either the trip or totalizing counter shaft to zero while the total cash actuating gears were in operative relation to the total cash counters a confusion of the record and a possible breakage of parts would follow. We have, therefore, provided means for locking the resetting shafts against rotation while the gears 81 and 82 are in operative relation to the group of counters. This means preferably consists in providing the hub 83, which carries the gears 81 and 82, at a point beyond the groove 84 with a disk 91. Two disks 92 are mounted on each of the resetting shafts 8 and 14 and are connected one to the other by means of a hub or sleeve 93 which is rigidly secured to the shaft. Each of these disks is provided with a cut-away portion or curved recess 94, the curvature of which corresponds to the curvature of the periphery of the disk 91. The disks 92 are so arranged relatively to the disk 91 that, when the actuating gears 81 and 82 are not in their operative relation to the groups of counters, the disk 91 will lie between the disks 92. When either of the counters 81 or 82 is moved into its operative position the disk 91 will be moved into alinement with one of the disks 92 on each shaft and a portion of its periphery will fit snugly within the recesses 94 of those disks, thereby securely locking the shafts 8 and 14 against rotation until the total cash actuating gear has again been moved into its inoperative position. Means are also provided for locking the driving mechanism against operation while either of the shafts 8 or 14 are being reset. To this end we have mounted on each of the shafts 8 and 14 disks 95 having formed therein substantially V-shaped recesses 96. An arm 97 is loosely mounted on the shaft 29 and has its lower portion bifurcated and extending about the actuating shaft 16, the lower ends of the arms of the bifurcation being beveled to fit within the recesses 96 in the collars or disks 95. The arm 97 is preferably mounted on the shaft 29 by means of a sleeve 98 to which the arm is rigidly secured. To the opposite end of the sleeve is secured a second arm 99 which extends upwardly and has its upper end adapted to enter a recess 100 formed in the slide bar 42, when the slide bar is in its normal or idle position. When the slide bar has been moved out of its normal position, the edge of the arm 99 will engage the edge of the slide bar. Consequently, the arm 97 will be held in engagement with the recesses in the collars 95 and the resetting shafts locked against movement. With the slide bar in its normal position the rotation of one of the resetting shafts, 8 or 14, will cause the arm 97 to be moved out of the recesses of the two resetting shafts and will cause the nose of the arm 99 to move into the recess 100, thus locking the slide bar 42 against movement until the resetting shaft has completed its rotation and the ends of the arms 27 have again entered the recesses in the collars 95.

Means are also provided for controlling the movement of the printing mechanism after the actuating shaft has been released. This means preferably consists of stop pins 108 and 156 movably mounted on one of the end members of the main frame on opposite sides of the printing mechanism and having their ends extending normally into the path of the carriage carrying the printing roller and arranged to limit its movement. These stop pins are controlled by the operator's key in substantially the same manner as that described in the above mentioned Patent, No. 839,630. This controlling means comprises an arm 101 pivotally mounted on the end member 1 of the frame, as shown at 102, and having one end curved to extend about a key barrel 103 which is arranged in substantial alinement with the resetting shaft 8. This curved portion of the lever 101 has a projection 104 which lies in the path of the conductor's key as it is rotated in the barrel 103. As the key engages this projection the lever 101 is moved about its pivotal center and a bell crank lever 106, to which one end of the lever 101 is connected, is rocked about its pivotal center on the indicator shaft 71. The bell crank lever 106 is also connected to one arm of a second bell crank lever 107, the other arm of which is connected to the stop pin 108 of the printing mechanism. Thus, when the conductor inserts his key in the barrel 103 and rotates the same to move the lever 101 about its pivotal center he will withdraw the stop pin which limits the forward movement of the printing mechanism, and this mechanism will be free to move into engagement with the trip printing counters as soon as the actuating shaft has been unlocked. The bell crank lever 106 is mounted on a sleeve 109 which extends through the end member 1 of the main frame and has rigidly secured to its inner end an arm 110, the upper end of which arm is adapted to lie in a recess or notch 111 formed in the slide bar 42. The arrangement of the arm 110 is such that the end thereof will lie in the recess 111 when the lever 101 is in its locking position, i. e., before the conductor has actuated his key. When the sleeve 109 has been rotated, through the medium of the lever 101 and bell crank lever 106, the end of the arm 110 will be moved out of the notch 111 and the slide bar 42 will be free to move. The upper end of the arm 110 is preferably enlarged or widened to prevent the same from being withdrawn from the notch until the unlocking operation has been completed.

In order that the identity of the person taking a record from the counters may be established means are provided for printing on the record an identifying number, which number is the number of the key carried by the conductor. This identifying mechanism is substantially the same as that shown and described in the patent to Ohmer, No. 797,598, dated Aug. 22, 1905, and comprises a plurality of printing wheels or type disks 256 which are mounted in alinement with the counters on the resetting shaft 8 and are rotatable about the same axis with these counters. Each of the type disks 256 is independently rotatable and is provided with an internal series of stepped teeth 257. The conductor's key 258 is provided with a series of selective projections 259 which are arranged in alinement with the respective type disks and are of such a length as to engage the teeth of those disks corresponding to the numbers it is desired to print and to rotate the disks to bring those numbers into printing position.

In order to print the car number on each record which is printed, a key 113 is provided with a slot 114 in its inner end and is adapted to be inserted through an opening in the end wall 1 of the main frame and to extend on the opposite sides of a base plate 115 which carries the matrix 116 on which the form of the record to be printed is set in type. The inner end of this key carries the number of the car in type, and is of such a depth, that, when the key is in place, this number will be arranged in its proper place in the matrix 116.

The mechanism so far described includes a conductor's trip counter which is reset to zero at the end of every trip and a conductor's totalizing counter from which a record is printed and which is reset to zero by the conductor when he leaves the car, thus securing a record of the fares received during the time he was in charge of the car. It frequently happens, however, that several conductors will be in charge of a car during the course of a day, and, in order to secure a record of the total fares for the entire day, we have provided an accumulator which is supported from the main frame of the machine and is actuated by the actuator for the counters to register a unit each time a unit is registered by the trip counter and totalizing counter. At the end of the day and after the totalizing counters have been reset to zero this accumulator is moved into operative relation to those totalizing counters and then reset to zero, in this manner transferring the record accumulated to the totalizing counters and enabling a record to be printed therefrom. A plurality of locks are provided for the several parts of the operating mechanism which are successively released in the course of manipulation of the mechanism and serve to prevent any step in the manipulation of the device being taken out of its regular order. In the present instance we have shown this accumulator as comprising a series of groups of gears 117, similar to the gears forming part of the counters above described. These gears are arranged in the same order and the groups correspond to the groups in the rear row of counters or the totalizer. These accumulating gears are mounted on a resetting shaft 118 which, in turn, is journaled in the forward ends of a plurality of arms 119, supported from a shaft 120 extending longitudinally of the machine near the rear portion thereof. The arms 119 each have a horizontal portion extending into the machine and supporting the resetting shaft 118, and a vertical portion which is rigidly secured to the shaft 120. The several arms are connected one to the other by means of bars 121, the arms and bars being preferably cast integral and forming a single supporting frame. The transfer gears 122 for the accumulator counters and their locking pawls 123 are similar to those of the printing counters and are mounted on the connecting member or bar 5 of the main frame. The accumulating gears 117 are so mounted in relation to the totalizing gears and the actuator 15 that a unit counter of the accumulator will be actuated by the actuator 15 upon each semi-rotation thereof. Thus, each time a fare is registered on the trip and totalizing counters a similar fare is recorded by and accumulated in the accumulator. The counters and the accumulator are preferably provided with ten-point gears, thus simplifying the construction and enabling the accumulator gears to mesh directly with the counter gears. The total cash counters of the accumulator gears are actuated from the total cash actuating gears 81 and 82 in the same manner as the fare counters are actuated from the actuator 15. The accumulator is not affected in any way by the resetting of the conductor's trip and the totalizing counter, except as hereinafter described relative to the trip numbering mechanism, and the accumulator is reset independently of these counters. The resetting shaft for the accumulator is preferably provided with a ratchet 124 which is rigidly secured thereto and is adapted to be engaged by a spring pressed pawl 125 which locks the resetting shaft against movement in the reverse direction at any time.

When it is desired to print the record accumulated by the accumulating gears the totalizing gears 13 are first reset to zero and the accumulator moved into operative relation therewith and then reset to zero. In this manner the record accumulated by these gears will be transferred to the totalizing counters and the record can be printed therefrom in the usual manner. It will be understood, of course, that only those gears of the accumulator are reset to zero which have been previously actuated, those that may not have been actuated forward not being affected by the resetting operation of the accumulator shaft, this being due to the construction of the resetting shaft in its relation to the accumulating gears thereon. An instance of such construction is shown in the patent to Kirchner, No. 867,049, dated Sept. 24, 1907, and owned by the assignee of this present invention. It will further be understood that there are as many banks of accumulator gears as there are banks of trip and totalizing counters, and that there are as many such banks as there are classes of fares to be dealt with, and, in addition thereto, cash and trip total counters and trip number counters. When the accumulator gears are brought into operative relation or mesh with the series of totalizing counters, and the accumulator shaft is reset to zero, only those totalizing counters which have been previously operated since the last inspector's report was taken will be operated, as above described, to re-record the fares and other transactions which they respectively have previously recorded. So that, with one actuation of the accumulator shaft by the inspector all of the totalizing counters which are thus to be operated will, by that one act, be so operated, whereby each totalizing counter will be in position to have printed from it an inspector's record. The accumulator shaft and its several gears are collectively referred to as the accumulator and there may be a greater or less number, or even only one, accumulator gear or accumulator *per se* without departing from our invention. It will be here noted that this part of our invention comprehends a capacity in the machine to record all of the separate fares and other transactions pertaining to each trip of the car, a record of which trip transactions the conductor may print at the end of each trip; further, that, while these detail transactions are being registered, a total of such transactions will, at the same time, be registered, a printed record of which may also be taken by the conductor at the end of his shift or time on the car; and still further, that, after such report has been printed and carried away by the conductor and deposited with the cashier or inspector of the road, (the conductor having reset to zero both the trip and totalizing counters after taking his report), such cashier or inspector may then go to the machine, and, by actuating the accumulator, cause the accumulated fares and other transactions, which have been transmitted to it, to be transferred back from it into the totalizing counters, from which he may then print a record showing the accumulated or grand total results of all of the transactions which have been previously recorded by all of the conductors who have operated the car for that time. We consider ourselves to be the first to devise such an organization of accumulators. Furthermore, we have described the accumulator as shiftable in the frame to throw it into and out of operative relation or mesh with the totalizing counters, but it is obvious that this bringing of the accumulator into and out of operative relation or mesh with the totalizer may be otherwise accomplished.

The accumulator 117 cannot be reset to zero until it has first been moved into its operative position relative to the totalizing counters, and, to this end, the shaft 118 is provided with a locking disk 126 having a notch 127. A projection or stop 128 is mounted on the end member of the frame in such a position as to enter the recess 127 in the disk 126 when the accumulator is in its elevated or normal position and thus lock the accumulator against resetting. When the accumulator has been moved into operative relation with the totalizing counters 13, the disk 126 will be moved beyond the end of the projection 128, and, consequently, the shaft 118 will be released and free to move. The arrangement of the disk 126 and its coöperating stop 128 is such that they serve to prevent the return of the accumulator to its normal position until it has been reset to zero and its record fully transferred to the printing counters. One corner of the projection 128 is cut away or beveled, as shown at 129, to facilitate the entrance of the projection into the recess 127 as the recess approaches the projection while the accumulator is being reset.

It will be observed that the relative positions of the accumulator gears, their transfer gears and the printing counters are such that the accumulator gears will partially mesh with the printing counters before they have been moved entirely out of mesh with their transfer gears, thus preventing any disturbance of the record, accumulated by said accumulator gears, while they are being moved from one position to the other.

A suitable lock is also provided to render it necessary to reset the totalizing counters 13 to zero before the accumulator 117 can be moved into mesh therewith. This lock comprises a bifurcated arm 130 loosely mounted on the shaft 131, which is the shaft carrying the transfer gears 11 for the totalizing counters. One finger of the bifurcation, 132, lies normally in engagement with a notch 133 formed in a disk 134 rigidly secured to the resetting shaft 118 for the accumulator. The other finger, 135, of the arm 130 is provided with a hook-shaped nose 136 which is normally out of engagement with a notch 137 formed in a collar or disk 138 rigidly secured to the actuating shaft 16, but is adapted to be moved into engagement with the notched collar when said arm 130 is moved about its pivotal center. The arm 135 is curved and extend about the shaft 131

14 of the totalizing counters. This shaft is provided with a collar 139 having a projection 140 having one straight face and the other face inclined. The finger 135 of the arm 130 has a projection 141 having one straight face and one inclined face. This projection extends in the rear of the projection 140 of the collar 139 and has its straight face adjacent to the straight face of that projection. With the parts in this position it will be apparent that the accumulator is locked in its elevated position and cannot be moved into engagement with the totalizing counters. The arm 130 is normally retained in this position by means of a pawl 142 having a nose 143 adapted to extend beneath a nose 144 extending downwardly and rearwardly from the arm 130. This pawl 142 is rigidly secured to a shaft 145 upon which are mounted the locking pawls 12 for the transfer gears 11, which shaft is spring-pressed and holds the nose 143 normally in engagement with the nose 144. When the shaft 14 of the totalizing counters is rotated in the direction of the arrow to reset the same, the inclined face of the projection 140 will engage the inclined face of the projection 141 as the shaft 14 approaches the completion of its movement and will elevate the finger 135, thereby causing the nose 144 to ride over the nose 143 of the pawl 142, moving the arm 130 about its pivotal center and moving the finger 132 out of engagement with the notched collar 134 on the accumulator shaft 118. As soon as the nose 144 has been moved beyond the nose of the pawl 142 this pawl moves forward and the nose 143 thereof engages the opposite side of the nose 144 of the arm 130 and retains the arm 130 in its uppermost position. The movement of the arm 130 has not only moved the finger 132 out of engagement with the notched disk 134, but has also moved the nose 136 of the finger 135 into engagement with the notched disk or collar 138 on the actuating shaft 16. The parts remain in this position until the accumulator and the totalizing counters have both been restored to their normal positions and a fare registered. Then the movement of the actuator 15 exerts a downward pressure on the finger 135, which is sufficient to move the arm 130 about its pivotal center and cause the nose 144 thereof to ride over the nose 143 of the pawl 142, thus bringing the finger 132 again into engagement with the notched collar 134 carried by the accumulator shaft 118 and again locking the accumulator shaft 118 in its elevated position. As soon as the nose 144 of the arm 130 moves beyond the nose of the pawl 142, this nose moves forward and again engages the lower side of the nose 144 and retains the arm 130 in its locking position. The accumulator is, however, positively retained in its elevated position by a lock which can be released only by the key of the proper official, such as the inspector. This lock comprises one or more arms, 146 and 146$^a$, which are rigidly secured to the shaft 120 which carries the supporting frame for the accumulator. In the present instance we have shown two of these arms, one arranged at either end of the machine. Each of these arms is provided with an inturned toe, 147 and 147$^a$. The toe 147 lies normally in a recess 148 formed in the lower side of an arm 149 rigidly secured to a shaft 150 arranged along the rear of the machine. The recess 148 is so arranged that when the toe 147 is within the recess the shaft 120 will be held in such a position as to retain the supporting frame for the accumulator in its elevated position. This locking mechanism is controlled by the inspector's key, as stated. This controlling mechanism consists in a lever 151 having its forward end curved, extending about a key barrel 152 and pivoted on one side thereof at 153. The curved portion of the lever 151 has a projection 154 which is adapted to be engaged by the inspector's key 180 when he inserts the key in the key barrel 152 and actuates the same. A second curved lever 155 also extends about the key barrel 152 in the same manner as does the lever 151. This second lever controls the stop pin 156 which limits the movement of the printing mechanism toward the rear or totalizing counters and is adapted to be actuated either by the conductor's key or by the inspector's key. In order that the conductor may withdraw the stop pin 156 without affecting the locking mechanism for the accumulating counters, his key is provided with a recess or cut-away portion, as shown at 105, which permits the same to pass the projection on the lever 151. The rear counter shaft is provided with identification means similar to that described in connection with the front counters and comprising printing disks 260 adapted to be actuated by the key inserted in the key barrel 152. Each key bears a different number and is so constructed as to set the printing disks to print that number. Thus, either the conductor or inspector can print a record from the rear or totalizing counters, thereby enabling the conductor to take a printed record of the fares collected during his run, and the record itself will indicate who printed the same.

The rear end of the lever 151 is enlarged and is connected to the forward end of the arm 149 by a pin and slot connection 157, thus permitting the adjacent ends of the arm 149 and the lever 151 to be elevated when the inspector actuates his key. This elevation of the inner end of the arm 149 elevates that arm a distance sufficient to release the toe 147 of the arm 146 from the recess 148. The toe 147ª of the arm 146ª is retained normally in its outermost position by means of a projection or cam 158 carried by the shaft 150. Consequently, when the arm 149 and shaft 150 are rotated a distance sufficient to release the toe of the arm 146 from the recess 148, the cam 158 will be moved beyond the toe of the arm 146ª.

The upward movement of the lever 151, and, consequently, the movement of the inspector's key, is limited by a pawl 159 coming in contact with a stop 160 mounted on the end member of the frame. This pawl is pivotally mounted on the enlarged end of the lever 151 and is held normally in its rearmost position by means of a spring 161 extending between a finger 162 carried by the pawl and the lower corner of the enlarged end of the lever 151. The amount of movement permitted to the lever 151 is sufficient to release the arms 146 and 146ª and permit the accumulator to be moved into operative relation to the totalizing counters, but is not sufficient to withdraw the stop pin for the printing mechanism. A lever 163 is pivotally mounted between its ends on the arm 146 and has secured to its rear end one end of a spring 164, the opposite end of which is secured to the end member of the frame. A finger 165 extending upwardly from the lever 163 engages a stop 166 and limits the movement of the lever about its pivotal center. The pawl 159 is provided with a shoulder 167, which, as the pawl is moved upwardly with the lever 151, engages beneath the forward end of the lever 163. When the accumulator is moved into operative relation with the totalizing counters the rearward movement of the arm 146 is such as to permit the forward end of the lever 163 to slip over the shoulder 167 of the pawl 159 and engage the side thereof. When the accumulator is returned to its normal position the forward movement of the arm 146 and lever 163 will push the upper end of the pawl 159 out of alinement with the stop 160. Consequently, the lever 151 is free to continue its upward movement. This movement may be imparted by any suitable means, preferably by a slight additional movement of the inspector's key, and causes the stop pin for the printing mechanism to be withdrawn. The movement of the inspector's key in the reverse direction, when it is removed after the record has been printed, moves the lever 151 downward and restores the several parts to their normal positions.

We have also provided means for retaining the accumulator in its operative relation with the totalizing counters until it has been reset to zero, thus making it necessary to transfer the record from the accumulator to the totalizing counters before the accumulator can be returned to its normal position and the printing mechanism unlocked and operated. To this end a plate or lever 168 is pivotally mounted near the end member 2 of the frame and is preferably mounted upon a shaft 169 which carries the transfer gears 122 for the accumulator. A spring 170 is connected at one end to the lower end of the plate 168 and at the other end to a fixed point on the end member of the frame. The lower end of the plate is provided with a projection 171 forming a shoulder. An arm 172, mounted on the shaft 120 which carries the supporting frame for the accumulator, has its lower end turned inwardly and arranged in the path of the rear edge of the plate 168. This plate is normally held in engagement with the arm 172 by means of the spring 170. When the accumulator is moved downwardly to bring the same into its operative relation with the totalizing counters the end of the arm 172 will be moved beyond the end of the plate 168 and this plate will be permitted to move under the tension of the spring until the projection 171 comes into engagement with the end of the arm 172. This movement of the plate 168 brings the edge of the plate into engagement with the end of the arm 172 and thus locks that arm in its retracted position, thereby retaining the accumulator in its operative position relative to the totalizing counters. To release the arm 172 when the accumulator has been reset to zero we pivotally mount a pawl 173 on the plate 168. A spring 174 connected at one end to the pawl 173 and at the other end to the plate 168 tends to move the pawl upward. The movement of the pawl about its pivotal center is limited, however, by a stop 175 carried by the plate 168. The pawl 173 has a nose 176 arranged in the path of a projection 177 carried by a collar or disk 178 rigidly secured to the resetting shaft 118 of the accumulator. This projection preferably has its front face inclined inwardly and rearwardly, as shown. As the accumulator is moved downward the projection 177 will engage the nose 176 of the pawl and move the same downward against the tension of the spring 174. As the resetting shaft 118 approaches the completion of its movement the front face of the projection 177 will engage the nose 176 and move the pawl 173 and the plate 168, to which it is secured, forward a distance sufficient to move the plate out of the path of the arm 172. When the accumulator is returned to its elevated or normal position the projection 177 will be raised out of engagement with the nose of the pawl 173 and the parts will be allowed to assume their normal positions.

Any suitable means may be provided for moving the accumulator into and out of its operative relation to the totalizing counters. In the present instance we have shown one end of the accumulator shaft 118 as extending through an inclined slot 179 and the movement is preferably imparted to this shaft by means of the resetting key which is engaged with the squared end thereof, and, when so engaged, forms a handle by means of which the desired movement can be readily imparted to the accumulator.

If the accumulator should be moved into operative relation to the totalizing gears and reset while one of the actuating gears for the total cash counters was in mesh with those counters the result would be a confusion of the total cash record and possibly a breakage of parts. We have, therefore, provided means for locking the accumulator in its inoperative position when one of the actuating gears is in mesh with the total cash counters. This means preferably comprises a disk 181 mounted on the stud 57, rigidly secured to the gear 56 and having two recesses 182 formed in the edge thereof. A finger 183 is rigidly secured to the shaft 120 which carries the supporting frame 119 and is provided with a nose 184 adapted to enter either of the recesses 182. These recesses are so arranged that when the actuator 15 has been moved in alinement with one of the paper fares, either the pass or the transfer, one of the notches will lie adjacent to the nose 184 of the finger 183. At all other times the periphery of the disk 181 will be adjacent to the nose 184 and this disk is of such a diameter that the nose 184 will lie close to the periphery thereof, and, consequently, the finger 183, shaft 120 and the accumulator supporting frame are all locked against movement about their pivotal center. When the actuator has been set to register a paper fare, one of the recesses in the disk will, as stated, be brought into position in alinement with the nose 184 and these recesses are of sufficient depth to permit the accumulator to be moved into operative relation with the totalizing counters. Means are also provided for locking the driving mechanism against movement when the accumulator has been moved into operative relation with the totalizing counters. This means, as here shown, consists of an arm 185 rigidly secured to the shaft 120 and extending forward therefrom with its forward end in alinement with a notch 186 formed in the adjacent edge of the slide bar 42. When the accumulator is in its normal or elevated position the arm 185 will lie above the notch in the slide bar 42, but, when the accumulator has been moved into its operative relation with the totalizing counters, the end of the arm will enter the notch and will lock the slide bar against movement so long as the accumulator remains in its operative position relative to the totalizing counters.

Each of the resetting shafts, i. e., the trip counter shaft, the totalizer shaft and the accumulator shaft is provided with a group of trip counters and means are provided for advancing these counters one unit each time the trip counter is reset to zero, thereby recording the number of trips made. For this purpose we have, in the present instance, mounted on the front or trip counter shaft a four toothed gear 191 which is rigidly secured thereto, and, when the trip counter shaft is reset to zero, will mesh with a six toothed intermediate pinion 192, which, in turn, meshes with an intermediate gear 193 loosely mounted on the actuating shaft 16. This gear 193 is provided on one face with two teeth 194 arranged on diametrically opposite sides of the gear and adapted to actuate the trip counters 195 and 196 mounted on the totalizer shaft and accumulator shaft, respectively, it being understood that these trip counters stand in their normal or primary position on the unit 1 instead of at zero. Thus, the first record taken before the trip counter shaft has been reset at all is one. In order to operate the trip counters on the trip counter shaft we have loosely mounted on the same shaft with the intermediate gear 193, i. e., the actuating shaft 16, a gear 197 which meshes normally with the unit trip counter on the totalizer shaft and with the unit trip counter on the trip counter shaft. Consequently, each time the gear 193 is rotated through a half revolution and the unit counter 195 on the totalizer shaft is advanced one unit, the unit trip counter 198 on the trip counter shaft will also be advanced one step, it being understood that these trip counters on the trip counter shaft are not reset to zero when that shaft is reset to zero. The usual transfer mechanism is provided for actuating the tens counter, etc., on the totalizer and accumulator shafts and a second intermediate gear 199 operatively connects the tens counter of the totalizer shaft with the tens counter of the trip shaft.

The operation of the machine will be readily understood from the foregoing description. To summarize briefly the several steps in their successive order it will be observed that when the conductor first enters the car he inserts his key in the key barrel 103 and actuates the same to withdraw the stop pin for the printing mechanism for the trip counters and to unlock the actuator. He then proceeds to register his fares and to print his records at the end of each trip. At the end of his run, covering a number of trips, he inserts his key in the key barrel 152, and, by actuating the same, withdraws the stop pin for the printing mechanism for the totalizing counters and prints his total record therefrom, resets his totalizer shaft to zero and leaves the car. This total record shows a record of each trip and the total of the several trips and is illustrated in Figs. 56 and 57. It will be noted that by comparing the conductor's key, shown in Fig. 50, with the inspector's key, shown in Fig. 49, the conductor's key has a recess which enables it to rotate without actuating the lever 151 controlling the accumulator locking mechanism. Consequently, the conductor cannot release this mechanism. At the end of the day's run, after several conductors have been in charge of the car, each carrying out the several steps above enumerated, the inspector will enter the car, insert his key in the barrel 152 and actuate the same, thereby releasing the accumulator. The totalizing counters having been reset to zero by the last conductor leaving the car the accumulator may be moved into operative relation with the totalizing counters and the accumulated record transferred from the accumulator to the totalizer. As soon as the accumulator has been completely reset to zero, thereby transferring the complete record, the accumulator may again be moved into its upper or normal position. The movement of the accumulator into and out of its operative relation with the totalizer has released the lock in the printing mechanism for the totalizing counters so that the inspector, by a slight further movement of the key, may now release this mechanism and print his record, this record being the total of all the other records printed during the course of the day, as shown in Fig. 55.

It will also be understood that, while we have described the machine as applied to city cars making a number of short runs, it can be equally well applied to interurban cars, or other uses, and the time of taking the totals and other designations varied. For instance, on an interurban machine it might be desirable to utilize the trip counters as station counters and to record the fares between two successive stations, resetting the same at each station and using the totalizing counters as the trip counters to give the total of all the fares received on the entire trip, the accumulator serving to give a total of all the fares received during the trips made in a single day or other specified time.

It will now be observed that essentially two leading ideas run through this invention. The first relates to the accumulator and its relation to the trip and totalizing counters, and its functions, as detailed and summarized in the foregoing description. The second relates to the system of locks treated in the aggregate as making up the concrete machine, and treated also separately, lock by lock. Thus, there is first what we would term an inspector's or cashier's key lock for unlocking the accumulator to permit it to be moved into operative position and to be operated to transfer its accumulated record over to the totalizing counters. Second, a controlling means for the printing mechanism used in conjunction with the totalizer, which controlling means is actuated by and is in part composed of the same key barrel which is included in the above-named lock, and which, by a further movement, after unlocking the accumulator, withdraws the stop which limits the movement of the printing mechanism, thereby enabling said printing mechanism to be operated when the actuating shaft has been unlocked. The withdrawal of this stop cannot take place until the accumulator has transferred its record to the totalizer and has itself been returned to its normal position. Third, the accumulator lock which locks the accumulator from rotating when it is in its upper or inoperative position. Fourth, the accumulator lock to prevent the accumulator from moving into operative position until the totalizing counters have been reset to zero. Then when the totalizer is reset to zero position it automatically unlocks this last named lock and permits the accumulator to come into operative position. Fifth, a lock to hold the accumulator in operative position until it is completely reset to zero, to insure the complete transfer to the totalizer of the accumulated record stored in the accumulator. Sixth, a lock to lock the actuator while the accumulator is in operative position. This lock so acts that, when the accumulator is moved into operative position, it thereby locks the actuator, and, when the accumulator is returned to its normal position, it unlocks the actuator. Seventh, a lock to lock the accumulator in its normal position when the machine is in position to register cash fares on the trip and totalizing counters. Eighth, an automatic lock to lock the actuator in a set position to operate a counter, whereby it insures the actuator remaining in that position during its act of operating such counter. Ninth, an automatic lock to lock the actuator in normal position and against movement when either the trip or totalizing counters are being reset to zero, whereby the machine is prevented from being operated at that time. Tenth, a lock to prevent the resetting of any of the counters when registration is started and not completed. Eleventh, an automatic lock to lock the trip counters and totalizing counters from being reset to zero while the actuator is set for a cash fare. It will further be noted that these several counters, viewed in the aggregate, operate in such an order of sequence that no part of the machine can be operated at any time except that part, which, at that time, should be operated. We wish to be understood as considering ourselves the first to devise such a system of locks as herein referred to, as well viewed separately as in their aggregate.

It will be apparent that while we have shown and described our invention as applied to a fare register the invention is capable of a much wider use and may be applied to recording and computing machines of various kinds, which may differ materially in construction and use; and that it is not essential that means be provided to take or print the record from the counters, or that the record be transferred back to the counters, it being sufficient that the record is accumulated by an accumulator and some means provided for disclosing that record to the operator or other authorized person. It will also be apparent that the use of the accumulator is not limited to a machine having two series of counters, but is applicable to machines having one or more series of counters, or even to a device using but a single counter. It will further be apparent that the exact construction and arrangement of parts is not, in most instances, the essence of the invention, but that the construction and arrangement of the parts may be greatly varied without departing from the spirit of our invention. We, therefore, wish it to be understood that we do not desire to be limited to the details of construction shown and described, for obvious modifications will occur to a person skilled in the art.

Having thus fully described our invention, what we claim as new and desire to secure by Letters Patent, is:—

1. In a register, the combination, with counting mechanism, and an accumulator normally disconnected from said counting mechanism, of means for actuating by one operation both said counting mechanism and said accumulator, while disconnected, to cause each to register a unit.

2. In a register, the combination, with counting mechanism, and an accumulator normally disconnected from said counting mechanism, of means for actuating by one operation both said counting mechanism and said accumulator, while disconnected, to cause each to register a unit, and means for transferring a record from said accumulator to said counting mechanism.

3. In a register, the combination, with a counter, of an accumulator normally disconnected from said counter, and actuating means, each operation of which actuates said counter and said accumulator, while disconnected, to cause each to register a unit.

4. In a register, the combination, with a counter, of an accumulator normally disconnected from said counter, actuating means, each operation of which actuates said counter and said accumulator, while disconnected, to cause each to register a unit, and means for transferring the record from said accumulator to said counter.

5. In a register, the combination, with a counter, of an accumulator normally disconnected from said counter, actuating means, each operation of which actuates said counter and said accumulator, while disconnected, to cause each to register a unit, means for resetting said counter to zero independently of said accumulator, and means for transferring a record from said accumulator to said counter.

6. In a register, the combination, with a group of printing counters, of an accumulator, actuating means, each operation of which actuates one of said counters and said accumulator to cause each to register a unit, and means for transferring a record from said accumulator to said printing counters.

7. In a register, the combination, with a counter, and means for actuating the same, of an accumulator adapted to be disconnected from said counter while said counter is being actuated and arranged to be actuated by the actuating means for said counter, and means for transferring a record from said accumulator to said counter.

8. In a register, the combination, with two parallel groups of counters, of an accumulator, actuating means, each operation of which actuates each of said groups of counters and said accumulator to cause each to register a unit, and means for transferring a record from said accumulator to one of said groups of counters.

9. In a register, the combination, with two parallel groups of counters, and means for actuating the same, of an accumulator arranged to be actuated by the actuating means for said counters, means for resetting both of said groups of counters to zero independently of said accumulator, and means for transferring a record from said accumulator to one of said groups of counters.

10. In a register, the combination, with a primary counter, a totalizing counter, and actuating means for said counters, of an accumulator arranged to be actuated by said actuating means, and means for transferring a record from said accumulator to said totalizing counter.

11. In a register, a counter, an accumulator movably supported and adapted to be moved into operative relation with said counter, and means for actuating said counter and said accumulator while said accumulator is in inoperative relation with said counter to cause each to register a unit.

12. In a register, a detail counter, a totalizing counter, an accumulator movably supported and adapted to be moved into and out of operative relation with said totalizing counter, and an actuator adapted to actuate said counters and said accumulator to cause each to register a unit.

13. In a register, the combination, with a main frame, and a counter mounted therein, of a supporting frame pivotally mounted on said main frame, an accumulator carried by said supporting frame and adapted to be moved into and out of operative relation with said counter and means for actuating said counter and said accumulator while said accumulator is in inoperative relation with said counter.

14. In a register, the combination, with a main frame, a counter mounted therein, and actuating means therefor, of a supporting frame pivotally mounted on said main frame, and an accumulator carried by said supporting frame movable toward and away from said counter and adapted to be actuated by the actuating means for said counter while in a position removed from said counter.

15. In a register, the combination, with a main frame, a resetting shaft mounted therein, a plurality of groups of counters mounted on said resetting shaft, and means for actuating said counters, of a supporting frame mounted on said main frame, a resetting shaft carried by said supporting frame, and an accumulator mounted on said latter resetting shaft and adapted to be moved into operative relation with said counters.

16. In a register, the combination, with a main frame, a resetting shaft journaled in said main frame, a plurality of counters carried by said resetting shaft, a shaft mounted in said main frame, and an actuator carried by said shaft and adapted to be moved into operative relation with different counters on said resetting shaft, of a second shaft mounted in said main frame, a supporting frame mounted on said last-mentioned shaft, a resetting shaft journaled in said supporting frame, and an accumulator mounted on the last-mentioned resetting shaft and adapted to be actuated by said actuator.

17. In a register, the combination, with a group of counters, and a group of accumulating gears movably supported and adapted to be moved into engagement with said counters, of means for actuating by one operation both said counters and said accumulating gears while out of engagement with each other.

18. In a register, the combination, with a group of counters, and an actuator therefor, of a group of accumulating gears movably supported near said group of counters and adapted to be actuated by said actuator when it is operated to actuate said counters.

19. In a register, the combination, with a plurality of groups of counters, and an actuator adapted to be moved into operative relation with any one of said groups of counters, of a plurality of groups of accumulating gears supported near said groups of counters while said counter is being actuated and arranged to be actuated by said actuator.

20. In a register, the combination, with two resetting shafts, a plurality of counters mounted on each of said resetting shafts, and a plurality of accumulating gears movably mounted near the counters which are on one of said resetting shafts, of an actuating gear so arranged that each operation thereof will actuate a counter on each of said resetting shafts and one of said accumulating gears.

21. In a register, the combination, with a resetting shaft, a plurality of groups of counters mounted thereon, an actuating shaft, an actuating gear slidably mounted on said shaft and held against rotation thereon, means for moving said actuating gear longitudinally of said shaft to bring the same into operative relation with any one of said groups of counters, and means for rotating said actuating shaft to cause said actuating gear to operatively engage said group of counters, of a plurality of groups of accumulating gears movably supported, adapted to be moved into operative relation with said counters and so arranged that the rotation of said actuating gear will actuate the accumulating gear corresponding to the counter with which the actuating gear is in operative relation.

22. In a register, the combination, with a counter, means for actuating the same, and means for resetting said counter to zero, of an accumulator adapted to be moved into operative relation with said counter, and means for locking said accumulator out of operative relation with said counter until said counter has been reset to zero.

23. In a register, the combination, with a counter, means for actuating the same, and means for resetting said counter to zero, of an accumulator adapted to be moved into and out of operative relation with said counter, means for locking said accumulator out of operative relation with said counter, and means actuated by the resetting of said counter for releasing said locking means.

24. In a register, the combination, with a counter, means for actuating the same, and means for resetting said counter to zero, of an accumulator, a locking member for locking said accumulator out of operative relation with said counter, means controlled by the resetting of said counter for moving said locking member into an inoperative position, and means controlled by said actuating means for moving said locking member into its operative position.

25. In a register, the combination, with a counter, means for actuating the same, and means for resetting said counter to zero, of an accumulator adapted to be moved into and out of operative relation with said counter, a locking member for retaining said accumulator normally out of operative relation with said counter, means actuated by the resetting of said counter to move said locking member into an inoperative position, and means for retaining said locking member in said inoperative position.

26. In a register, the combination, with a counter, means for actuating the same, and means for resetting said counter to zero, of an accumulator adapted to be moved into and out of operative relation with said counter, a locking member for retaining said accumulator normally out of operative relation with said counter, means for retaining said locking member in its operative position, means actuated by the resetting of said counter to move said locking member into its inoperative position, and means for retaining said locking member in its inoperative position.

27. In a register, the combination, with a counter, means for actuating the same, and means for resetting said counter to zero, of an accumulator adapted to be moved into and out of operative relation with said counter, a locking member for retaining said accumulator normally out of operative relation with said counter, means for retaining said locking member in its operative position, means actuated by the resetting of said counter to move said locking member into its inoperative position, means for retaining said locking member in its inoperative position, and means controlled by said actuating means for moving said locking member into its operative position.

28. In a register, the combination, with a resetting shaft, a counter mounted thereon, and an actuator for actuating said counter, of a second resetting shaft movable toward and away from the first-mentioned resetting shaft, an accumulator mounted on said second resetting shaft, and means for locking said second resetting shaft and said accumulator in a position removed from said first-mentioned resetting shaft and said counter while said counter is being actuated.

29. In a register, the combination, with a resetting shaft, a counter mounted thereon, and an actuator for actuating said counter, of a second resetting shaft movable toward and away from the first-mentioned resetting shaft, an accumulator mounted on said second resetting shaft, means for locking said second resetting shaft normally in a position removed from said first-mentioned resetting shaft, and a part carried by the first-mentioned resetting shaft for moving said locking means into an inoperative position when said first-mentioned resetting shaft is actuated.

30. In a register, the combination, with a resetting shaft, a counter mounted thereon, and an actuator for actuating said counter, of a second resetting shaft movable toward and away from the first-mentioned resetting shaft, an accumulator mounted thereon, a part rigidly secured to said second resetting shaft, a locking arm pivotally mounted and having a part extending into the path of the fixed part carried by said second resetting shaft, and having a second part arranged near the first-mentioned resetting shaft, and a part carried by said first-mentioned resetting shaft and adapted to engage the adjacent part of said locking arm to move said locking arm about its pivotal center.

31. In a register, the combination, with a resetting shaft, a counter mounted thereon, and an actuator for actuating said counter, of a second resetting shaft movable toward and away from the first-mentioned resetting shaft, an accumulator mounted on the same, a collar rigidly secured to said second resetting shaft and having a shoulder, a bifurcated locking arm pivotally mounted and having one arm lying normally in the path of said shoulder and having a second arm provided with a projection, and a projection rigidly secured to the first-mentioned resetting shaft and adapted to engage the projection carried by said locking arm when said resetting shaft is actuated and to move said locking arm about its pivotal center.

32. In a register, the combination, with a resetting shaft, a counter mounted thereon, and an actuator for actuating said counter, of a second resetting shaft movable toward and away from the first-mentioned resetting shaft, an accumulator mounted thereon, a collar rigidly secured to said second resetting shaft and having a shoulder, a pivotally mounted locking arm having a part lying normally in the path of said shoulder and having a nose projecting therefrom, a spring-pressed pawl adapted to engage said nose, and means carried by the first-mentioned resetting shaft for moving said locking arm about its pivotal center against the resistance offered by said pawl.

33. In a register, the combination, with a resetting shaft, a counter mounted thereon, and an actuator for actuating said counter, of a second resetting shaft movable toward and away from the first-mentioned resetting shaft, an accumulator carried thereby, a locking arm having a beveled nose and adapted to be moved into and out of position to lock said second resetting shaft against movement toward or away from the first-mentioned resetting shaft, means actuated by the first-mentioned resetting shaft for moving said locking arm into its inoperative position, means for moving said locking arm into its operative position, and a pawl adapted to engage either edge of said beveled nose to retain said locking arm in either its operative or its inoperative position.

34. In a register, the combination, with a counter, and means for actuating the same, of an accumulator movable toward and away from said counter, means for locking said accumulator in a position removed from said counter, and key operated means for releasing said locking mechanism.

35. In a register, the combination, with a counter, and means for actuating the same, of an accumulator movable toward and away from said counter, means for locking said accumulator in a position removed from said counter, a lever controlling said locking means, and a key for actuating said lever.

36. In a register, the combination, with a main frame, counters mounted in said main frame, and an actuator for said counters, of a supporting frame pivotally mounted on said main frame, an accumulator carried by said supporting frame, and means for locking said supporting frame normally in a position to support said accumulator at a point removed from said counter.

37. In a register, the combination, with a main frame, counters mounted in said main frame, and an actuator for said counters, of a shaft mounted in said main frame, a supporting frame rigidly secured to said shaft, an accumulator carried by said supporting frame, and means for locking said shaft normally against rotation.

38. In a register, the combination, with a main frame, counters mounted in said main frame, and an actuator for said counters, of a shaft mounted in said main frame, a supporting frame rigidly secured to said shaft, an accumulator carried by said supporting frame, means for locking said shaft against rotation, and key-controlled means for releasing said locking means.

39. In a register, the combination, with a main frame, counters mounted in said main frame, and an actuator for said counters, of a shaft mounted in said main frame, a supporting frame rigidly mounted on said shaft, an accumulator carried by said supporting frame, an arm rigidly secured to said shaft, and an arm pivotally mounted on said main frame and having a part lying in the path of the first-mentioned arm, and means for moving the last-mentioned arm to carry said part out of the path of said first-mentioned arm.

40. In a register, the combination, with a main frame, counters mounted in said main frame, and an actuator for said counters, of a supporting frame pivotally mounted on said main frame, an accumulator carried by said supporting frame, an arm rigidly connected to and movable with said supporting frame, and a part pivotally mounted on said main frame and arranged normally in the path of said arm to lock said supporting frame against movement.

41. In a register, the combination, with a main frame, counters mounted in said main frame, and an actuator for said counters, of a shaft mounted in said main frame, a supporting frame rigidly secured to said shaft, an accumulator carried by said supporting frame, an arm rigidly secured to said shaft, a second shaft mounted in said main frame, and a part carried thereby and arranged normally in the path of said arm to lock said supporting frame against movement.

42. In a register, the combination, with a main frame, counters mounted in said main frame, and an actuator for said counters, of a shaft mounted in said main frame, a supporting frame rigidly secured to said shaft, an accumulator carried by said supporting frame, an arm rigidly secured to said shaft having a toe extending at an angle to the body portion thereof, an arm pivotally mounted in said main frame and having a recess adapted to receive said toe, and means for moving the last-mentioned arm toward and away from said toe.

43. In a register, the combination, with a main frame, counters mounted in said main frame, and an actuator for said counters, of a shaft mounted in said main frame, a supporting frame rigidly secured to said shaft, an accumulator carried by said supporting frame, an arm rigidly secured to said shaft having a toe extending at an angle to the body portion thereof, an arm pivotally mounted in said main frame and having a recess adapted to receive said toe, a lever pivotally mounted on said main frame and having one end connected to the last-mentioned arm, and means for moving said lever about its pivotal center.

44. In a register, the combination, with a main frame, counters mounted in said main frame, and an actuator for said counters, of a supporting frame pivotally mounted in said main frame, an accumulator carried by said supporting frame, an arm rigidly connected to and movable with said supporting frame, a second arm pivotally mounted on said main frame and having a recess therein adapted to receive the free end of the first-mentioned arm, a lever pivotally connected to said main frame and having one end connected with said second arm, a key barrel located adjacent to said lever, and a key adapted to enter said barrel, the rotation of said key serving to move said lever about its pivotal center and move said second arm out of engagement with the first-mentioned arm.

45. In a register, the combination, with a main frame, counters mounted in said main frame, and an actuator for said counters, of a supporting frame pivotally mounted on said main frame, an accumulator carried by said supporting frame, an arm rigidly connected to said supporting frame and movable therewith, a second arm pivotally mounted on said main frame and having a part adapted to be moved into and out of the path of the first-mentioned arm, a lever pivotally mounted on said main frame and having one end connected with said second arm, means for actuating said lever to move the part carried by said second arm out of the path of the first-mentioned arm, and means for limiting the movement of said lever.

46. In a register, the combination, with a main frame, counters mounted in said main frame, and an actuator for said counters, of a supporting frame pivotally mounted on said main frame, an accumulator carried by said supporting frame, an arm rigidly connected to said supporting frame and movable therewith, a second arm pivotally mounted on said main frame and having a part adapted to be moved into and out of the path of the first-mentioned arm, a lever pivotally mounted on said main frame and having one end connected with said second arm, means for actuating said lever to move the part carried by said second arm out of the path of the first-mentioned arm, a stop carried by said main frame, a pawl movably mounted on said lever, and means for retaining said pawl normally in position to engage said stop when said lever is moved about its pivotal center.

47. In a register, the combination, with a main frame, counters mounted in said main frame, and an actuator for said counters, of a supporting frame pivotally mounted on said main frame, an accumulator carried by said supporting frame, an arm rigidly connected to said supporting frame and movable therewith, a second arm pivotally mounted on said main frame and having a part adapted to be moved into and out of the path of the first-mentioned arm, a lever pivotally mounted on said main frame and having one end connected with said second arm, means for actuating said lever to move the part carried by said second arm out of the path of the first-mentioned arm, a spring-pressed pawl movably mounted on said lever, a stop carried by said main frame in the path of said pawl, and means controlled by the movement of said supporting frame for moving said pawl out of alinement with said stop.

48. In a register, the combination, with a main frame, counters mounted in said main frame, and an actuator for said counters, of a supporting frame pivotally mounted on said main frame, an accumulator carried by said supporting frame, an arm rigidly connected to said supporting frame and movable therewith, a second arm pivotally mounted on said main frame and having a part adapted to be moved into and out of the path of the first-mentioned arm, a lever pivotally mounted on said main frame and having one end connected with said second arm, means for actuating said lever to move the part carried by said second arm out of the path of the first-mentioned arm, thereby releasing said supporting frame and permitting the accumulator to be moved into operative relation to said counters, a spring-pressed pawl carried by said lever, a stop mounted on said main frame in the path of said pawl, a finger carried by the first-mentioned arm and adapted to engage said pawl when the accumulator is moved into its inoperative position and move said pawl out of the path of said stop.

49. In a register, the combination, with a counter, means for actuating the same, an accumulator, and means for moving said accumulator into and out of operative relation with said counter, of a lock for holding said accumulator in its inoperative position, a second lock adapted to control a printing mechanism, common means for actuating said locks, and a stop adapted to check the movement of the first-mentioned lock after said accumulator has been released but before the second lock has moved sufficiently far to release the printing mechanism.

50. In a register, the combination, with a counter, means for actuating the same, an accumulator, and means for moving said accumulator into and out of operative relation with said counter, of a lock for holding said accumulator in its inoperative position, a second lock adapted to control a printing mechanism, common means for actuating said locks, a stop adapted to check the movement of the first-mentioned lock after said accumulator has been released but before the second lock has moved sufficiently far to release the printing mechanism, and means controlled by the movement of said accumulator into and out of its operative position for releasing the first-mentioned locking means from said stop.

51. In a register, the combination, with a plurality of groups of fare counters, a group of total cash counters, an actuator for said fare counters, other actuators for said total cash counters, and means for moving said last-mentioned actuators into and out of operative relation with said total cash counters, of an accumulator movable into and out of operative relation with the several groups of counters, and means for locking said accumulator against movement when one of the last-mentioned actuators are in operative relation to said total cash counters.

52. In a register, the combination, with a main frame, a plurality of groups of counters mounted therein, an actuator, and means for moving said actuator into operative relation with one of said groups of counters, of a supporting frame pivotally mounted in said main frame, an accumulator carried by said supporting frame, a finger rigidly connected to and movable with said supporting frame and having a projection, a disk rotatably mounted on said main frame and having a recess in the edge thereof, and means for rotating said disk to move said recess into alinement with said projection when said actuator has been moved into operative relation with a predetermined one of said groups of counters.

53. In a register, the combination, with a main frame, a plurality of groups of counters mounted therein, an actuator, and driving mechanism for said actuator to cause the same to actuate said counters, of an accumulator movable into and out of operative relation to said counters, and means for locking said driving mechanism against movement while said accumulator is in operative relation with said counters.

54. In a register, the combination, with a main frame, a plurality of groups of counters mounted therein, an actuator therefor, a slide bar operatively connected to said actuator and having a notch therein, of a supporting frame pivotally mounted in said main frame, an accumulator carried by said supporting frame, an arm rigidly connected to and movable with said supporting frame and having one end adapted to enter the slot in said slide bar when said supporting frame has been moved about its pivotal center in one direction.

55. In a register, the combination, with a group of counters, and means for actuating the same, of an accumulator movable into and out of operative relation to said counters, means for retaining said accumulator normally in inoperative relation with said counters, means for resetting said accumulator to zero, and means for retaining said accumulator in its operative relation to said counters until said accumulator has been reset to zero.

56. In a register, the combination, with a group of counters, and means for actuating the same, of an accumulator movable into and out of operative relation to said counters, means for resetting said accumulator to zero, a lock for retaining said accumulator in operative relation with said counters, and means actuated by the resetting of said accumulator to zero for releasing said lock.

57. In a register, the combination, with a group of counters, and means for actuating the same, of an accumulator, means for moving said accumulator into and out of operative relation to said counters, means for resetting said accumulator to zero, a part connected to and movable with said accumulator, a member movably mounted near said part, means for moving said member into the path of said part after said accumulator has been moved into operative relation with said counters, and means actuated by the resetting of said accumulator to zero to move said member out of the path of said part.

58. In a register, the combination, with a counter, and means for actuating the same, of a supporting frame, an accumulator carried by said supporting frame and adapted to be moved into and out of operative relation with said counter, means for resetting said accumulator to zero, an arm rigidly connected to and movable with said supporting frame, a member pivotally mounted near said supporting frame, means for moving said member into the path of said arm after said accumulator has been moved into operative relation with said counter, and means actuated by the resetting of said accumulator to zero to move said member out of the path of said arm.

59. In a register, the combination, with a main frame, a group of counters mounted therein, and means for actuating said counters, of a supporting frame pivotally mounted in said main frame, a resetting shaft carried by said supporting frame, an accumulator mounted on said resetting shaft, an arm secured to and movable with said supporting frame, a plate pivotally mounted on said main frame, means for moving said plate into the path of said arm when said supporting frame has been actuated to move said accumulator into operative relation with said counters, a part carried by said plate and having a nose, and a projection carried by said resetting shaft and adapted to engage said nose when said resetting shaft is actuated and move said plate out of the path of said arm.

60. In a register, the combination, with a plurality of groups of counters, and an actuator adapted to be moved into operative relation with any one of said groups of counters, of a bar slidably mounted in said register, and means for operatively connecting said bar to said actuator.

61. In a register, the combination, with a counter, and means for actuating said counter, of a shaft operatively connected with said actuating means, a slide bar mounted in said register, and means for operatively connecting said slide bar with said shaft.

62. In a register, the combination, with a counter, and an actuator for said counter, of driving mechanism comprising a shaft operatively connected with said actuator, a ratchet rigidly secured to said shaft, a pinion rotatably mounted upon said shaft, a pawl carried by said pinion and adapted to engage said ratchet, and a slide bar having a rack adapted to mesh with said pinion.

63. In a register, the combination, with a counter, and means for actuating said counter, of a shaft operatively connected to said actuating means, a pair of ratchets rigidly secured to said shaft, a pair of pinions loosely mounted on said shaft and each having a pawl adapted to engage the respective ratchets, and a rack bar having two racks, one arranged on each side of said shaft and adapted to mesh with said pinions.

64. In a register, the combination, with a counter, and an actuator for said counter, of driving mechanism comprising a shaft operatively connected to said actuator, a ratchet rigidly secured to said shaft, a pinion loosely mounted on said shaft, a pawl mounted on said pinion, adapted to engage said ratchet and normally arranged at a point removed from said ratchet, and a slide bar having a rack meshing with said pinion.

65. In a register, the combination, with a counter, and an actuator for said counter, of driving mechanism comprising a shaft operatively connected to said actuator, a slide bar, means actuated by said slide bar for rotating said shaft, and means for limiting the rotary movement of said shaft.

66. In a register, the combination, with a counter, and an actuator for said counter, of driving mechanism comprising a shaft operatively connected to said actuator, a slide bar, means actuated by said slide bar for rotating said shaft, and means controlled by the movement of said slide bar for limiting the movement of said shaft.

67. In a register, the combination, with a counter, and means for actuating said counter, of a shaft operatively connected to said counter, a slide bar, means actuated by said slide bar for rotating said shaft, a member rigidly secured to said shaft and projecting therefrom, and a stop carried by said slide bar and adapted to be moved into the path of the member carried by said shaft.

68. In a register, the combination, with a counter, and means for actuating said counter, of a shaft operatively connected with said actuating means, a pair of ratchets rigidly mounted on said shaft and spaced some distance apart, and a pair of pinions loosely mounted on said shaft and each having a pawl adapted to engage one of said ratchets, a slide bar having two racks arranged on opposite sides of said shaft and meshing with the respective pinions, a member rigidly secured to said shaft and projecting therefrom, a pair of stops arranged one at each end of said rack and adapted to be moved into the path of the member mounted on said shaft when said slide bar approaches the limit of its movement in one direction or the other.

69. In a register, the combination, with a counter, and means for actuating said counter, of a shaft operatively connected to said actuating means, a member rigidly secured to said shaft, a slide bar, a stop carried by said slide bar and adapted to be moved into the path of said member when said slide bar approaches one limit of its movement, and means for operatively connecting said slide bar to said shaft, said means being arranged to permit said slide bar to move a limited distance before said shaft is actuated.

70. In a register, the combination, with a counter, and means for actuating said counter, of a shaft operatively connected with said actuating means, a pair of ratchets rigidly secured to said shaft, pinions loosely mounted on said shaft, and a pawl carried by each of said pinions and adapted to engage one of said ratchets, said pawl being normally supported at a point removed from said ratchet, a member carried by said shaft, a slide bar having two racks arranged on opposite sides of said shaft and meshing with the respective pinions, and stops arranged near the opposite ends of said racks and adapted to be moved into the path of the member carried by said shaft as said slide bar approaches the limit of its movement in one direction or the other.

71. In a register, the combination, with a group of alined counters, and an actuator movable longitudinally of said counters, of driving mechanism comprising a shaft extending at an angle to the direction of movement of said actuator and operatively connected thereto, a slide bar operatively connected to said shaft, and means actuated by the movement of said slide bar in one direction for locking said slide bar against movement in the opposite direction until it has been moved to the limit of its movement in the first-mentioned direction.

72. In a register, the combination, with a plurality of groups of counters, an actuator for said counters, and means for moving said actuator into operative relation with any one of said groups of counters, of a shaft operatively connected to said actuator, a slide bar, means for operatively connecting said slide bar to said shaft, means for limiting the movement of said shaft, and means controlled by the movement of said slide bar in one direction for locking the same against movement in the opposite direction until its movement in the first-mentioned direction has been completed.

73. In a register, the combination, with a plurality of groups of counters, a shaft arranged longitudinally of said counters, an actuator slidably mounted on said shaft and held against rotation relatively thereto, means for moving said actuator longitudinally of said shaft, and a bevel pinion rigidly secured to said actuator shaft, of a second shaft arranged at an angle to the first-mentioned shaft, a bevel pinion carried by said second shaft and meshing with the first-mentioned pinion, a ratchet rigidly secured to said second shaft, a pinion loosely mounted on said second shaft, a pawl carried by said pinion and adapted to engage said ratchet, and a slide bar having a rack meshing with said pinion.

74. In a register, the combination, with a plurality of counters, means for actuating said counters, and means for independently resetting said counters to zero, of a device controlled by the resetting of any of said counters for locking said actuating means against operation.

75. In a register, the combination, with a plurality of resetting shafts, counters mounted on each of said shafts, means for actuating said counters, and means for operating said actuating means, of means controlled by the operation of any of said resetting shafts for locking said operating means against movement.

76. In a register, the combination, with a resetting shaft, a counter mounted thereon, an actuator for said counter, a slide bar, for operating said actuator, having a notch therein, and a collar mounted on said resetting shaft having a recess in the edge thereof, of an arm pivotally mounted near said resetting shaft, having one end beveled and adapted to enter the recess in said collar, and a second arm connected to and movable with the first-mentioned arm and adapted to enter the notch in said slide bar when the resetting shaft has been actuated to move the recess in said collar beyond the end of said first-mentioned arm.

77. In a register, the combination, with two substantially parallel resetting shafts, counters carried by said resetting shafts, an actuating shaft extending parallel with and midway between said resetting shafts. an actuator mounted on said actuating shaft, a slide bar operatively connected to said actuator and having a notch in one edge thereof, and a collar rigidly secured to each of said resetting shafts and having a notch in the edge thereof, of a bifurcated member pivotally supported near said resetting shafts, extending about said actuating shaft, having the ends of its arms beveled and adapted to fit in the recesses in said collars, and an arm rigidly secured to and movable with said bifurcated member and having its end arranged to enter the notch in said slide bar when one of said resetting shafts shall have been actuated to move the notch in the collar carried thereby beyond the end of the adjacent arm of said bifurcated member.

78. In a register, the combination, with a plurality of groups of counters, an accumulator comprising a plurality of gears, an actuator adapted to be set in operative relation with different groups of said counters and different accumulator gears, a rotary member operatively connected to said actuator to move the same from one position to another, and driving mechanism for said actuator to cause the same to actuate one of said counters and one of said gears, of means operatively connected to said rotary member and controlled by the movement of said driving mechanism for locking said actuator against setting movement while said driving mechanism is in operation.

79. In a register, the combination, with a plurality of groups of counters, an accumulator comprising a plurality of gears arranged parallel to said counters, an actuating shaft arranged longitudinally of said counters and said accumulators, an actuator slidably mounted on said shaft and held against rotation relatively thereto, means for moving said actuator longitudinally of said shaft, and driving mechanism for rotating said shaft, of means operatively connected to said actuator and controlled by the movement of said driving mechanism for locking said actuator against sliding movement while said driving mechanism is being operated.

80. In a register, the combination, with a plurality of groups of counters, an actuating shaft arranged longitudinally thereof, an actuator slidably mounted on said shaft and held against rotation relatively thereto, a second shaft operatively connected to said actuator for moving the same longitudinally of said actuating shaft, and driving mechanism for imparting a rotary movement to said actuating shaft, of a member operatively connected to said second shaft and having a series of notches, a pivoted dog having a nose adapted to enter any one of said notches, and means controlled by said driving mechanism for locking said dog in positive engagement with said notched member.

81. In a register, the combination, with a plurality of groups of counters, an actuating shaft arranged longitudinally thereof, an actuator slidably mounted on said shaft and held against rotation relatively thereto, a second shaft operatively connected to said actuator for moving the same longitudinally of said actuating shaft, and driving mechanism for imparting a rotary movement to said actuating shaft, of a pinion operatively connected to said second shaft, a rack bar meshing with said pinion and having a series of V-shaped notches therein, a pivoted dog having a beveled nose adapted to fit within any one of said V-shaped notches, and means controlled by said driving mechanism for moving said nose into one of said notches and locking the same therein.

82. In a register, the combination, with a plurality of counters, an actuating shaft arranged longitudinally thereto, an actuator slidably mounted on said shaft and held against rotation relatively thereto, a second shaft operatively connected to said actuator to move the same longitudinally of said actuating shaft, and a slide bar operatively connected to said actuating shaft to impart a rotary movement thereto, of a pinion operatively connected to said second shaft, a rack bar meshing with said pinion and having a plurality of notches therein, a pivoted dog having a nose adapted to enter one of said notches, and a part carried by said dog and adapted to be actuated by said slide bar to move said nose into one of said notches.

83. In a register, the combination, with a plurality of groups of counters, an actuating shaft arranged longitudinally thereof, an actuator slidably mounted on said shaft and held against rotation relatively thereto, a second shaft operatively connected to said actuator to move the same longitudinally of said actuating shaft, a slide bar operatively connected to said actuating shaft to impart a rotary movement thereto and having a recess therein, a pinion carried by said second shaft, a gear meshing with said pinion, and a second pinion carried by said gear and rotating therewith, a rack bar meshing with said second pinion and having a plurality of notches therein, a pivoted dog having a nose adapted to enter any one of said notches, a part carried by said dog adapted to enter the recess in said slide bar when said slide bar is in its normal position, whereby said dog is free to move about its pivotal center when said slide bar is in its normal position but will be locked against such movement when said slide bar is removed from its normal position.

84. In a register, the combination, with a main frame, a plurality of groups of counters mounted in said main frame, an actuating shaft arranged longitudinally to said counters, an actuator slidably mounted on said shaft and held against rotation relatively thereto, a second shaft operatively connected to said actuator to move the same longitudinally of said actuating shaft, and a slide bar operatively connected to said actuating shaft to impart a rotary movement thereto and having a recess in one edge thereof, the front wall of said recess being straight and the rear wall thereof inclined toward the edge of said slide bar, of a pinion mounted on said second shaft, a gear meshing with said pinion, and a second pinion carried by said gear, a rack bar meshing with said second pinion and having a slot near one end thereof, a guide carried by said frame and extending through said slot, said rack bar also having a plurality of notches in the edge thereof, a dog pivotally mounted on said main frame having a nose adapted to enter any one of said notches, a projection carried by said dog adapted to enter the recess in said slide bar when said slide bar is in its normal position and to be engaged by the inclined wall of said recess when said slide bar is moved from its normal position.

85. In a register, the combination, with a printing counter, a supporting plate, a matrix carried by said supporting plate and surrounding the printing point of said counter, of a key having a slot in one end thereof and provided with type, said key being adapted to fit over said plate to support said type within said matrix.

86. In a register, the combination, with a plurality of groups of cash counters, an actuator, means for setting said actuator in operative relation with either of said groups of cash counters, a group of total cash counters, a plurality of actuating members for said total cash counters, and means controlled by the setting of the first-mentioned actuator for moving one or the other of said last-mentioned actuators into operative relation with said total cash counters.

87. In a register, the combination, with a plurality of groups of cash counters, an actuator adapted to be moved into operative relation with either of said groups of cash counters, an indicator to indicate the position of said actuator, a group of total cash counters, and a plurality of actuators, either of which may be moved into operative relation with said total cash counters, of means controlled by the movement of said indicator for moving one or the other of said last-mentioned actuators into operative relation with said group of total cash counters.

88. In a register, the combination, with a plurality of groups of cash counters, an actuating shaft, an actuator carried by said shaft and adapted to be moved into operative relation with any one of said groups of cash counters, an indicator operatively connected to said actuator to indicate its position relatively to said cash counters, a group of total cash counters, two actuating gears mounted on said actuating shaft and each adapted to be moved into operative relation with said total cash counters, each of said actuating gears having a different number of teeth, and means controlled by said indicator for moving one or the other of said actuating gears into operative relation with said total cash counters.

89. In a register, the combination, with a plurality of cash counters, an actuating shaft, an actuator carried thereby and adapted to be moved into operative relation with any one of said cash counters, an indicator operatively connected to said actuator to indicate its position on said actuating shaft, a group of total cash counters, a plurality of actuating gears, each containing a different number of teeth, slidably mounted on said actuating shaft, of a collar operatively connected to said indicator and having a cam groove therein, a lever pivotally mounted between its ends, a part carried by one end of said lever adapted to enter said cam groove, and means for operatively connecting the other end of said lever to said actuating gears, whereby the movement of said indicator will move said gears into or out of operative relation with said total cash counters.

90. In a register, the combination, with a plurality of groups of cash counters, an actuating shaft, an actuator mounted on said shaft and adapted to be moved into operative relation with any one of said cash counters, an indicator shaft operatively connected to said actuator, and an indicator carried by said shaft to indicate the position of said actuator relative to said cash counters, a group of total cash counters, a plurality of actuating gears connected one to the other and slidably mounted on said actuating shaft, of a collar rigidly secured to said indicator shaft and having a cam groove therein, a lever pivotally supported between its ends, a part carried by one end of said lever and adapted to enter said cam groove, means for connecting the other end of said lever to said actuating gears, whereby the position of said actuating gears relative to said total cash counters will be controlled by the position of said indicator shaft.

91. In a register, the combination, with a resetting shaft, a group of total cash counters mounted on said resetting shaft, an actuating shaft, and a plurality of actuators carried by said actuating shaft, any one of which is adapted to be moved into operative relation with said total cash counters, of a part rigidly secured to said resetting shaft, and a coöperating part carried by said actuating shaft and connected to said actuators, whereby when one of said actuators is in operative relation with said total cash counters said coöperating part will lie in the path of the part carried by said resetting shaft and lock said resetting shaft against movement.

92. In a register, the combination, with a resetting shaft, a group of total cash counters carried thereby, an actuating shaft, and a plurality of actuators mounted on said shaft, any one of which may be moved into operative relation with said group of total cash counters, of a plurality of disks rigidly secured to said resetting shaft, each having a recess in one edge thereof, and a disk connected to said actuators and so arranged that when one of said actuators is moved into operative relation with said group of total cash counters the edge of said last-mentioned disk will lie in the recess of one of the first-mentioned disks, thereby locking the resetting shaft against movement.

93. In a register, the combination, with a group of total cash counters, an actuating shaft, a sleeve slidably mounted thereon, two actuating gears mounted on said sleeve and adapted to be moved into operative relation with said group of total cash counters, of a pair of disks rigidly secured to said resetting shaft, each having a recess in the edge thereof, a disk rigidly secured to said sleeve and arranged between the disks on said resetting shaft, whereby the movement of said sleeve to bring one of said actuating gears into operative relation with said group of total cash counters will move the disk carried by said sleeve into the recess in one of the disks carried by said resetting shaft, thereby locking said resetting shaft against movement.

94. In a register, the combination, with a plurality of groups of counters, an actuator therefor, and driving mechanism for said actuator, of a rotary indicator operatively connected to said driving mechanism, stops carried by said indicator, a pawl pivotally mounted near said indicator and adapted to be moved into the path of said stops, and means carried by said driving mechanism for actuating said pawl when said driving mechanism is actuated.

95. In a register, the combination, with a plurality of groups of counters, an actuator therefor, and driving mechanism for said actuator comprising a driving shaft, of a rotary indicator operatively connected to said driving mechanism, stops carried by said indicator, a shaft arranged parallel with the axis of rotation of said indicator, a pawl carried by said shaft and adapted to be moved into the path of said stops, a crank arm rigidly secured to said shaft, a pitman connected to said crank arm, and cam actuated means carried by said driving shaft for actuating said pitman and said shaft.

96. In a register, the combination, with a plurality of groups of counters, an actuator therefor, and driving mechanism for said actuator comprising a driving shaft, of a rotary indicator operatively connected to said driving mechanism, stops carried by said indicator, a shaft arranged parallel with the axis of rotation of said indicator, a pawl carried by said shaft and adapted to be moved into the path of said stops, a crank arm rigidly secured to said shaft, a pitman connected to said crank arm, a disk rigidly secured to said driving shaft, a cam groove formed in one face of said disk, and a projection carried by said pitman and adapted to enter said cam groove.

97. In a register, the combination, with two resetting shafts, an actuating shaft, and trip counters carried by each of said resetting shafts, of a mutilated gear carried by one of said resetting shafts, a gear loosely mounted on said actuating shaft, an idle pinion adapted to mesh with said mutilated gear and said loosely mounted gear, an auxiliary tooth carried by said loosely mounted gear and adapted to actuate the trip counters on the other of said resetting shafts, and means actuated by the movement of the trip counters on the last-mentioned resetting shaft for actuating the trip counters on the first-mentioned resetting shaft.

98. In a register, the combination, with two resetting shafts, an actuating shaft, and trip counters carried by each of said resetting shafts, of a mutilated gear carried by one of said resetting shafts, a gear loosely mounted on said actuating shaft, an idle pinion adapted to mesh with said mutilated gear and said loosely mounted gear, an auxiliary tooth carried by said loosely mounted gear and adapted to actuate the trip counters on the other of said resetting shafts, an idle gear mounted on said actuating shaft and meshing with the trip counter on the last-mentioned resetting shaft and with the trip counter on the first-mentioned resetting shaft.

99. In a register, the combination, with a trip resetting shaft, a totalizer shaft, an accumulator shaft and an actuating shaft, of trip counters carried by said trip resetting shaft, totalizer shaft and accumulator shaft, an intermediate pinion, a mutilated gear carried by said trip resetting shaft and adapted to mesh with said intermediate pinion when said shaft is reset to zero, an actuator mounted on said actuating shaft, meshing with said intermediate pinion and adapted to actuate the trip counters on said totalizer shaft and said accumulator shaft, and an idle gear mounted on said actuating shaft and meshing with the trip counter on said totalizer shaft and said trip resetting shaft.

100. In a register, the following mechanism; a counter, means for actuating the same, means for resetting said counter to zero, an accumulator movable into and out of operative relation with said counter, and means for resetting said accumulator to zero, in combination with means for locking said mechanism against each successive step in its operation until the preceding step has been completed.

101. In a register, the following mechanism; a counter, means for actuating the same, means for resetting said counter to zero, an accumulator movable into and out of operative relation with said counter, and means for resetting said accumulator to zero, in combination with means for locking said mechanism against each successive step in its operation, and means controlled by the operation of each preceding step for releasing the locking means for the next succeeding step in the operation of the mechanism.

102. In a register, the combination, with counting mechanism, and means for actuating the same to register a plurality of units, of an accumulator supported out of engagement with said counting mechanism, and means for actuating said accumulator, each time said counting mechanism is actuated, to register a corresponding plurality of units.

103. In a register, the combination, with counting mechanism, and means for actuating the same, of an accumulator supported out of engagement with said counting mechanism, means for actuating said accumulator each time said counting mechanism is actuated, and means for disclosing the record accumulated by said accumulator.

104. In a register, the combination, with a detail counter, a totalizing counter, and an accumulator, of means for taking a record from both the detail counter and the totalizing counter.

105. In a register, the combination, with a detail counter, a totalizing counter, and an accumulator, of means for taking a record from both the detail counter and the totalizing counter and from said accumulator.

106. In a register, the combination, with a printing counter, and an accumulator associated therewith, of means for printing a record from said printing counter.

107. In a register, the combination, with a detail printing counter, a totalizing counter, and an accumulator, of means for printing a record from the detail counter, from the totalizing counter and of the accumulated count.

108. In a register, the combination, with a printing counter, an accumulator, and means for transferring a record from said accumulator to said printing counter, of means for printing a record from said printing counter.

109. In a register, the combination, with a series of alined printing counters, and an accumulator adapted to coöperate with each of said printing counters, of means for taking a record from said printing counters and of the accumulated count.

110. In a register, the combination, with a printing counter, and means for actuating the same, of an accumulator, means for actuating said accumulator each time said printing counter is actuated to register a unit, and means for printing a record from said printing counter.

111. In a register, the combination, with a printing counter, and means for actuating the same, of an accumulator, means for actuating said accumulator each time said printing counter is actuated to register a unit, means for transferring the record from said accumulator to said printing counter, and means for printing a record from said printing counter.

112. In a register, the combination, with a printing counter, of an accumulator, actuating means, each operation of which operates said printing counter and said accumulator to cause each to register a unit, and means for printing a record from said printing counter.

113. In a register, the combination, with a printing counter, of an accumulator, actuating means, each operation of which actuates said printing counter and said accumulator to cause each to register a unit, means for transferring a record from said accumulator to said printing counter, and means for printing a record from said printing counter.

114. In a register, the combination, with a printing counter, an accumulator movably supported and adapted to be moved into operative relation with said printing counter, and means for actuating by one operation both said printing counter and said accumulator to cause each to register a unit, of means for printing a record from said printing counter.

115. In a register, the combination, with a detail printing counter, a totalizing printing counter, an accumulator movably supported and adapted to be moved into and out of operative relation with said totalizing counter, and an actuator adapted to actuate said printing counter and said accumulator to cause each to register a unit, of means for printing a record from said detail printing counter and from said totalizing printing counter.

116. In a register, the combination, with a main frame, a printing counter mounted therein, and actuating means therefor, of a supporting frame pivotally mounted on said main frame, an accumulator carried by said supporting frame and adapted to be actuated by each operation of the actuating means for said printing counter, and means for printing a record from said printing counter.

117. In a register, the combination, with a group of printing counters, and means for actuating said printing counters, of a group of accumulating gears movably supported and adapted to be moved into and out of operative relation with said printing counters, and means for printing a record from said printing counters.

118. In a register, the combination, with a group of printing counters, of a group of accumulating gears movably supported near said group of counters and adapted to be moved into and out of operative relation therewith, a common actuator for said printing counters and said accumulating gears, and means for printing a record from said printing counters.

119. In a register, the combination, with a resetting shaft, printing counters mounted on said shaft, and means for actuating said counters, of type disks mounted on said shaft to print the line of division number, a disk rotatably mounted near the front of said register and operatively connected to said printing disks to set the same to print the desired number.

120. In a register, the combination, with a resetting shaft, printing counters mounted on said shaft, means for actuating said counters, and an indicator shaft, of printing disks rotatably mounted on said resetting shaft and adapted to print the line or division number, an indicator disk mounted on said indicator shaft and having a gear, and a train of gearing for connecting said indicator disk with one of said printing disks.

121. In a register, the combination, with printing counters, and printing disks adapted to print the line or division number, of line or division number indicators, and means for controlling said printing disks from said indicators.

122. In a register, an actuating mechanism comprising a shaft, a pair of pinions operatively connected to said shaft and arranged to rotate said shaft continuously in the same direction, and an actuating bar having two racks arranged on opposite sides of said shaft and adapted to engage the respective pinions.

123. In a register, an actuating mechanism comprising a shaft, a pair of pinions operatively connected to said shaft and arranged to rotate said shaft continuously in the same direction, and an actuating bar having two racks arranged on opposite sides of said shaft and adapted to engage the respective pinions, and means for compelling said actuating bar to move through a complete operation before it can be returned to normal position.

124. In a register, the combination, with printing counters, printing mechanism, locking means for retaining said printing mechanism normally in its idle position, and a wrench or key for operating said printing mechanism, of means actuated by said wrench or key for unlocking said printing mechanism.

125. In a register, the combination, with printing counters, printing mechanism, a shaft for actuating said printing mechanism, and a key or wrench for rotating said shaft, of means for holding said shaft against rotation, and means actuated by said key for releasing said holding means.

126. In a register, the combination, with printing counters, a printing mechanism, a shaft for actuating said printing mechanism, a key or wrench for rotating said shaft, and a casing inclosing said register and having an opening to receive said key or wrench, of an inwardly extending boss formed on said casing and surrounding said opening and having a recess in the inner edge thereof, a collar slidably mounted on said shaft within said casing, held against rotation relatively thereto and having a projection adapted to enter the recess in said boss, and means for retaining said projection normally in said recess.

127. In a register, the combination, with printing counters, a printing mechanism, a shaft for actuating said printing mechanism, a key or wrench for rotating said shaft, and a casing inclosing said register and having an opening to receive said key or wrench, of an inwardly extending boss formed on said casing and surrounding said opening and having a recess in the inner edge thereof, a collar slidably mounted on said shaft within said casing, held against rotation relatively thereto and having a projection adapted to enter the recess in said boss, means for retaining said projection normally in said recess, and means for compelling said shaft to be rotated a distance sufficient to cause the complete operation of said printing mechanism before said shaft can be returned to its normal position.

128. In a fare register, the combination, with a detail counter, an accumulator, means for transferring a record from said accumulator to said detail counter, and an identifying device, of means for taking a record from said detail counter and said identifying device at a single operation.

129. In a register, the combination, with a detail counter, a totalizing counter, an accumulator, and means for taking a record from said counters and from said accumulator, of means for identifying the person taking the record from either of said counters or from said accumulator.

130. In a register, the combination, with a ten-point counter wheel, a ten-point accumulator wheel, and an actuator, each operation of which actuates both of said wheels, of means for transmitting the accumulated count from the accumulator wheel to the counter wheel.

In testimony whereof, we affix our signatures in presence of two witnesses.

WILFRED I. OHMER.
DAVID B. WHISTLER.
JOHN E. McALLISTER.

Witnesses:
GUSTAV BECKER, Jr.,
A. B. ROBERTSON.